United States Patent [19]
Nishiwaki et al.

[11] Patent Number: 5,953,375
[45] Date of Patent: Sep. 14, 1999

[54] PACKING METHOD, RECORDING MEDIUM AND TRANSMITTING AND RECEIVING APPARATUS FOR VARIABLE LENGTH DATA

[75] Inventors: Hirohisa Nishiwaki; Hideki Mimura, both of Yokohama; Sigeru Todokoro, Fujisawa, all of Japan

[73] Assignee: Kabushiki Kaisha Toshiba, Kawasaki, Japan

[21] Appl. No.: 08/821,757

[22] Filed: Mar. 20, 1997

[30] Foreign Application Priority Data

Mar. 21, 1996 [JP] Japan ................................ 8-064865

[51] Int. Cl.⁶ .................................................. H04L 27/00
[52] U.S. Cl. .......................................................... 375/259
[58] Field of Search ................................ 375/259; 348/390, 348/422; 358/427

[56] References Cited

U.S. PATENT DOCUMENTS

| | | | |
|---|---|---|---|
| 4,574,362 | 3/1986 | Spindel et al. | 364/900 |
| 5,321,398 | 6/1994 | Ikeda | 341/67 |
| 5,347,478 | 9/1994 | Suzuki et al. | 364/715.02 |
| 5,440,404 | 8/1995 | Okamato | 358/432 |
| 5,481,364 | 1/1996 | Ito | 358/261.1 |
| 5,566,192 | 10/1996 | Moon | 371/47.1 |
| 5,621,405 | 4/1997 | Park et al. | 341/67 |
| 5,745,251 | 4/1998 | Yamagami | 358/426 |

FOREIGN PATENT DOCUMENTS

| | | |
|---|---|---|
| 56-21446 | 2/1981 | Japan . |
| 57-207960 | 12/1982 | Japan . |
| 60-201571 | 10/1985 | Japan . |
| 5-20794 | 1/1993 | Japan . |
| 6076473 | 3/1994 | Japan . |
| 6139705 | 5/1994 | Japan . |
| 6162671 | 6/1994 | Japan . |
| 8022674 | 1/1996 | Japan . |
| 8031104 | 2/1996 | Japan . |
| 8289248 | 11/1996 | Japan . |
| 8339637 | 12/1996 | Japan . |
| 8340507 | 12/1996 | Japan . |
| 9251717 | 9/1997 | Japan . |
| 9252449 | 9/1997 | Japan . |

*Primary Examiner*—Stephen Chin
*Assistant Examiner*—Mohammad Ghayour
*Attorney, Agent, or Firm*—Pillsbury Madison & Sutro LLP

[57] ABSTRACT

Audio data at the top of each packet is always set at the top of sample data, thereby allowing packets to be treated as units and facilitating audio data processing, such as timing processes, sequential processing, etc. A plurality of samples consisting of variable length data are arranged in a packet of predetermined bytes. In one embodiment, all samples other than the first sample are sequentially arranged with the top of the first sample being disposed at a predetermined position of the packet. The total byte length of the sample data is less than or equal to a maximum packet byte length If the actual packet byte length is less than the maximum packet byte length, stuffing byte data or a padding byte data is inserted to fill in a remaining portion.

3 Claims, 22 Drawing Sheets

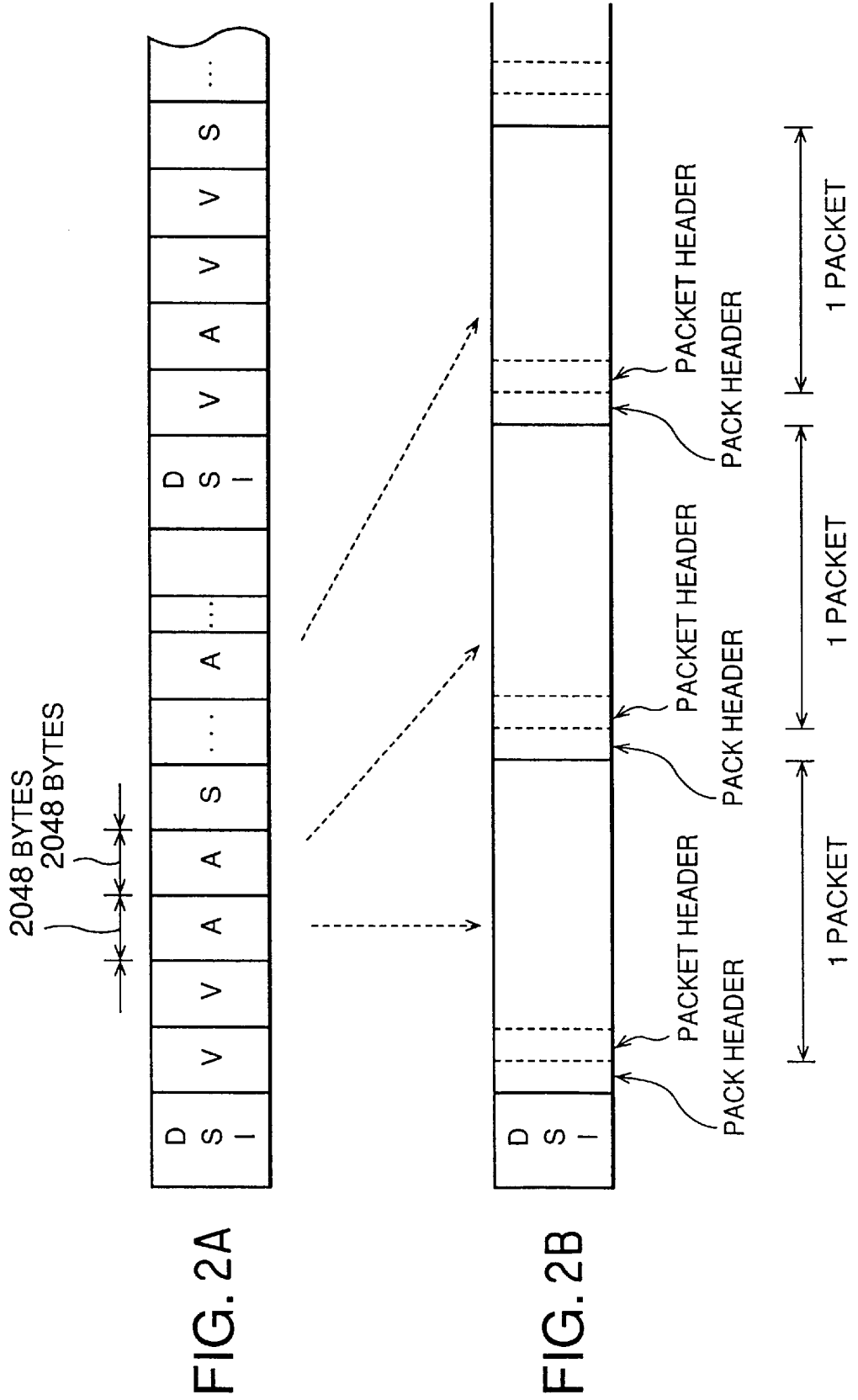

| Stream mode | | | Data in a packet | | | |
|---|---|---|---|---|---|---|
| Number of channels | fs (kHz) | Quantization (bits) | Maximum number of samples in a packet | Data size (bytes) | Packet stuffing of first/ other PES packet (bytes) | Padding packet for first/ other PES packet (bytes) |
| 1(mono) | 48/96 | 16 | 1004 | 2008 | 2/5 | 0/0 |
| | 48/96 | 20 | 804 | 2010 | 0/3 | 0/0 |
| | 48/96 | 24 | 670 | 2010 | 0/3 | 0/0 |
| 2(stereo) | 48/96 | 16 | 502 | 2008 | 2/5 | 0/0 |
| | 48/96 | 20 | 402 | 2010 | 0/3 | 0/0 |
| | 48/96 | 24 | 334 | 2004 | 6/0 | 0/9 |
| 3 | 48/96 | 16 | 334 | 2004 | 6/0 | 0/9 |
| | 48/96 | 20 | 268 | 2010 | 0/3 | 0/0 |
| | 48 | 24 | 222 | 1998 | 0/0 | 12/15 |
| 4 | 48/96 | 16 | 250 | 2000 | 0/0 | 10/13 |
| | 48 | 20 | 200 | 2000 | 0/0 | 10/13 |
| | 48 | 24 | 166 | 1992 | 0/0 | 18/21 |
| 5 | 48 | 16 | 200 | 2000 | 0/0 | 10/13 |
| | 48 | 20 | 160 | 2000 | 0/0 | 10/13 |
| | 48 | 24 | 134 | 2010 | 0/3 | 0/0 |
| 6 | 48 | 16 | 166 | 1992 | 0/0 | 18/21 |
| | 48 | 20 | 134 | 2010 | 0/3 | 0/0 |
| 7 | 48 | 16 | 142 | 1988 | 0/0 | 22/25 |
| 8 | 48 | 16 | 124 | 1984 | 0/0 | 26/29 |

FIG. 4

| Field | Number of bits | Number of bytes | Value |
|---|---|---|---|
| Pack_start_code | 32 | 4 | 000001BAh |
| SCR | 48 | 6 | Provider defined |
| Program_mux_rate | 24 | 3 | 10.08Mbps |
| Pack_stuffing_length | 8 | 1 | no stuffing length=000b |

FIG.17

| Field | Number of bits | Number of bytes | Value | Comment |
|---|---|---|---|---|
| packet_start_code_prefix | 24 | 3 | 000001h | |
| stream_id | 8 | 1 | 101111101b | |
| PES_packet_length | 16 | 2 | | private_stream_1 |
| PES_information | 24 | 3 | | |
| PTS | 40 | 5 | | |
| buffer_size etc. | | 1 | | |
| | | 2 | | |
| stuffing_byte | | 0~7 | | |
| sub_stream_id | 8 | 1 | | |
| number_of_frame_heders | 8 | 3 | | |
| first_access_unit_pointer | 16 | | | |
| audio_emphasis_flag audio_mute_flag audio_frame_number quantization_word_lengh audio_sampling_frequency number_of_audio_channels dynamic_range_control | | 3 | | |
| audio data | | | | |

FIG. 18

PACKING METHOD, RECORDING MEDIUM AND TRANSMITTING AND RECEIVING APPARATUS FOR VARIABLE LENGTH DATA

BACKGROUND OF THE INVENTION

The present invention relates to a data arranging method and a medium for recording or transferring data or the like to be recorded on a digital video disk and a digital audio disk, and a signal processing apparatus for processing the data.

Recently, digital video disks have been developed as optical disks in addition to conventional compact disks (hereinafter referred to as "CDs") for audio usage, and players for such digital video disks have also been developed. In particular, the digital video disks include a kind of disk which is about the same size (12 cm in diameter) as the conventional CDs and is designed such that about two hours of picture information can be recorded on and reproduced from that disk. For such digital video disks, there is a format which allows for voices or music in eight different languages as well as superimposed information in thirty two different languages to be recorded on the same disk in addition to picture information.

Again, digital video disks have been developed which can record voices or music in multiple languages in addition to main picture information while having the same size as conventional CDs.

If such digital video disks become available on the market, there would be a natural demand to reproduce music or voice (audio signals) portions from new digital video disks as well as from the conventional CDs. The recording systems for audio signals include a compression system and a linear PCM system. If one considers a video disk from which audio signals containing music voice and information can be reproduced by an exclusive audio player, it is effective to record data by the linear PCM technique used for conventional CDs. However, if multiple kinds of data are recorded on a recording medium, it becomes necessary to synchronize reproduction timings of the data with one another. In such a case, it is desirable that the data be handled easily and effectively.

BRIEF SUMMARY OF THE INVENTION

Accordingly, an object of the present invention is to provide a packing method, a recording medium, and a transmitting and receiving apparatus for variable length data, for facilitating the handling of audio data having a number of channels and a number of quantization bits that are set in a variety of ways.

To achieve the above object, a stored packet having a plurality portions with sample data of different data lengths in a pack of predetermined bytes in accordance with the number of channels, the plural portions of sample data are sequentially arranged with the top of the sample data being positioned at a predetermined position of the packet, a total byte length of the sample data is equal to or smaller than a maximum byte length of the packet. If a byte length of the packet is less than the maximum byte length, data of a stuffing byte or a padding byte is inserted to fill a remaining portion.

With the use of such a packing method, audio data at the top of each packet is always at the top of the sample data and packets can be treated as units. This facilitates the timing and sequential processing for the processing of audio data.

Additional objects and advantages of the invention will be set forth in the description which follows, and in part will be obvious from the description, or may be learned by practice of the invention. The objects and advantages of the invention may also be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are explanatory diagrams showing an example of the arrangement of packs and the structure of an audio pack in this arrangement according to this invention;

FIG. 4 is an explanatory diagram exemplifying a list of sizes of linear PCM data in a packet, to which this invention is adapted;

FIG. 17 is a table representing the contents of the pack header of the audio pack;

FIG. 18 is a table illustrating the contents of the packet header of the audio pack;

DETAILED DESCRIPTION OF THE INVENTION

Preferred embodiments of the present invention will now be described with reference to the accompanying drawings.

To begin with, a data arrangement by the linear PCM system in the data recording system according to this invention will be discussed. Note that 16 bits, 20 bits or 24 bits, for example, are arbitrarily used as quantization bits in linear PCM data. Further, audio modes include monaural, stereo, 3 channels, 4 channels, 5 channels, 6 channels, 7 channels and 8 channels modes.

Suppose that there are eight channels (A to H) of audio signals. Those audio signals are sampled at a sampling frequency of 48 KHz or 96 KHz to be quantized. The following will describe an example where the quantization bits are 20 bits.

Figures 1A, 1B, 1C, 1D:
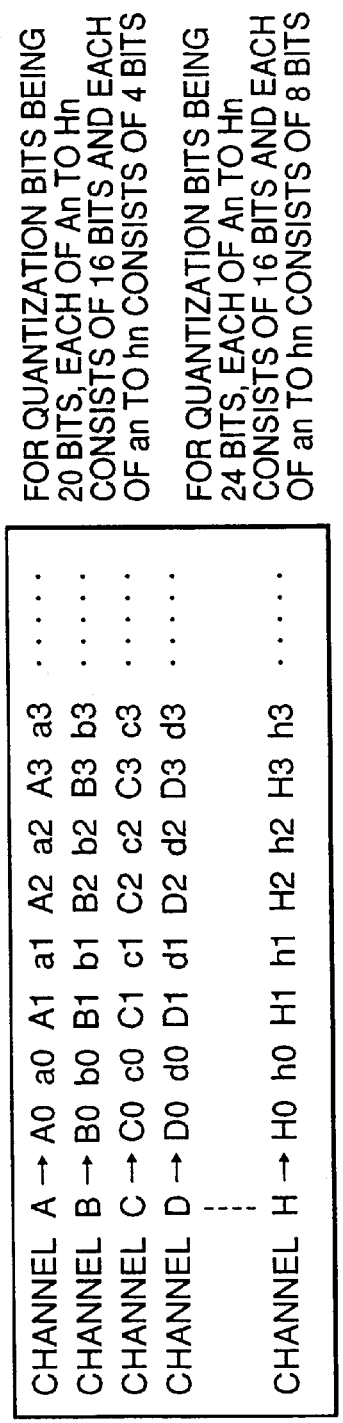
FIGS. 1A through 1D are explanatory diagrams showing a sample structure and the arrangement of samples for explaining a basic embodiment of this invention.

FIG. 1A shows how eight channels of audio signals A to H are sampled. It is assumed that each sample is quantized to, for example, 20 bits. FIG. 1A also illustrates that each sample of 20 bits is separated into a main word and an extra word.

The main words of the individual channels are indicated by upper case alphabet letters plus a suffix "n," and the extra words by lower case alphabet letters plus the suffix "n" where n (=0, 1, 2, 3, ...) indicates the sampling order. Each main word consists of 16 bits and each extra word consists of 4 bits.

Individual samples are generated, for example, in the form of A0$a$0, A1$a$1, A2$a$2, A3$a$3, A4$a$4 and so forth for the signal A, B0$b$0, B1$b$1, B2$b$2, B3$b$3, B4$b$4 and so forth for the signal B, C0$c$0, C1$c$1, C2$c$2, C3$c$3, C4$c$4 and so forth for the signal C, ..., H0$h$0, H1$h$1, H2$h$2, H3$h$3, H4$h$4 and so forth for the signal H.

FIG. 1B illustrates the above word arrangement format as a sequence of samples in the case where those words are recorded on a recording medium.

First, each sample data consisting of 20 (=M) bits is separated to a main word of 16 (=m1) bits on the most significant bit (MSB) side and an extra word of 4 (=m2) bits on the least significant bit (LSB) side. Next, the zero-th (=2n-th) main words in the individual channels are collectively arranged. Then, the first (=(2n+1)-th) main words in the individual channels are collectively arranged. Subsequently, the zero-th (=2n-th) extra words in the individual channels are collectively arranged. Then, the first (=(2n+1)-th) extra words in the individual channels are collectively arranged. Note that n=0, 1, 2, . . . .

A group of main words in the individual channels comprises is one main sample. Likewise, a group of extra words in the individual channels comprises one extra sample.

With such a format, a data reproduction process implementing a low-end machine (e.g., the one which operates in a 16-bit mode) should handle only main words, while a data reproduction process implementing a high-cost machine (e.g., the one which operates in a 20-bit mode) should handle both, main words and their associated extra words.

FIG. 1C shows how individual samples are arranged by using the specific numbers of bits for the main sample and extra sample.

In such quantized linear PCM codes, the separation of a 20-bit sample to a 16-bit main word and a 4-bit extra word permits a 16-bit mode machine to easily discard unnecessary portions by performing data processing in 8 bits units for areas having extra samples in the sample arrangement. This is because two extra samples are 4 bits×8 channels and 4 bits×8 channels, which can be processed i.e., eight consecutive times in 8 bits units.

The feature of this data arrangement is not limited to this embodiment. In either case where there exits an odd number of channels, or where an extra word consists of 8 bits, the total number of bits of two consecutive extra samples will be an integer multiple of 8 bits, so that a low-cost machine which reproduces only main words can skip extra samples by executing a discarding process n consecutive times, 8 bits by 8 bits, in accordance with the mode.

Data in the state depicted in FIG. 1B may then be subjected to a modulation process for recording on a recording medium. If data is to be recorded together with other control information and video information, it is preferable that the data be recorded in a form that is easily managed on the time base in order to facilitate data handling and synchronization. In this respect, the following frame formation, grouping, and packet formation.

FIG. 1D shows a sequence of audio frames. The unit of data over a given reproduction time of 1/600 sec is one frame. In one frame, 80 or 160 samples are assigned. With a sampling frequency of 48 KHz, one sample is 1/4800 sec and (1/48000)×80 samples=1/600 sec. With a sampling frequency of 96 KHz, one sample is 1/9600 sec and (1/96000)×160 samples=1/600 sec. Obviously, one frame consists of 80 samples or 160 samples.

FIG. 2A shows the relationship between the packet and frame.

DSI is data search information, V is a video object, A is an audio object, and S is a sub picture object. Each block is called a pack. One pack is defined to be 2048 bytes. One pack includes a packet, and consists of a pack header, a packet header and a packet. DSI is information for controlling each data during playback time, such as the start address and end address information of each pack.

FIG. 2B only shows extracted audio packs. Although DSI packs, video packs V and audio packs A are actually mixed in the arrangement as shown in FIG. 2A, only audio packs A are illustrated in FIG. 2B to help understand the relationship between a frame and packs. According to the standards of this system, information is arranged so that it takes about 0.5 sec to reproduce information between a DSI and the next DSI. Because one frame is 1/600 sec as mentioned above, 30 audio frames exist between one DSI and another DSI. The amount of data (D) of one frame varies depending on the sampling frequency (fs), the number of channels (N) and the number of quantization bits (m).

When fs=48 KHz, D=80×N×m, and when fs×96 KHz, D=160×N×m.

Therefore, one frame should not necessarily correspond to one pack, for example, a plurality of frames or a less than one frame may correspond to one pack. That is, the head of a frame may come in a middle of one pack. Positional information of the head of a frame is described in the pack header, and is described as the number of data counts (timings) from the pack header or DSI. In reproducing data from the aforementioned recording medium, the reproducing apparatus acquires a frame of audio packets, extracts data of the channel to be reproduced, and supplies the data to the audio decoder to perform a decoding process.

Figure 3:
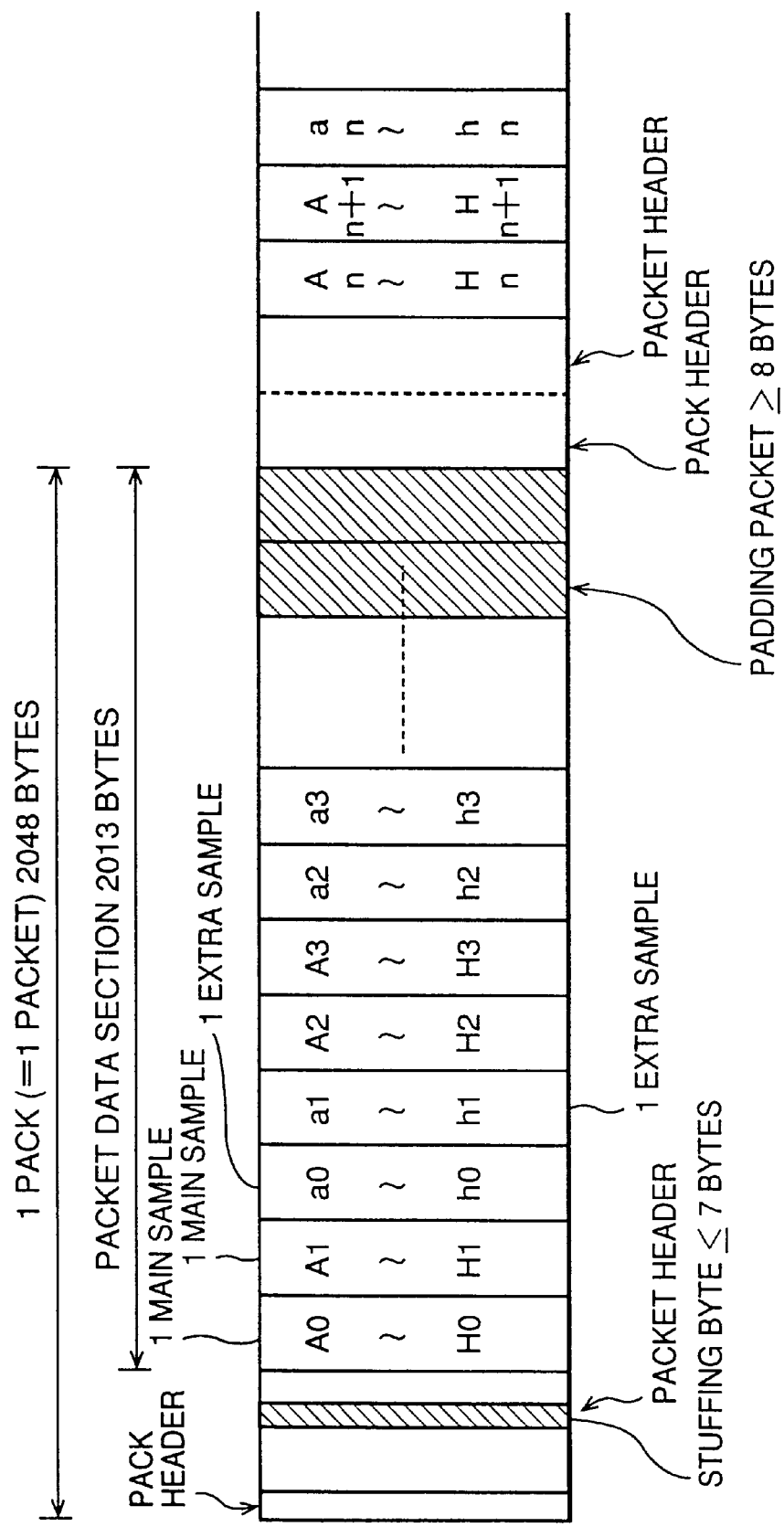
FIG. 3 is an explanatory diagram depicting the detailed structure of an audio pack.

FIG. 3 provides an enlarge view of an audio pack. Arranged in the data section of this audio pack are twin pairs of samples with the top twin pair of samples (A0-H0, A1-H1) located at the head of the data area. The number of bytes in one pack is fixed to 2048 bytes. Because samples are of variable length, 2048 bytes may not necessarily equal an integer multiple of the byte length of the twin pairs of samples. Therefore, there may be a case where the maximum byte length of one pack differs from the byte length of (a twin pair of samples×integer number). In this case, the byte length of a pack is set to become the pack's byte length≧(a twin pair of samples×integer number). If a part of a pack remains, a stuffing byte is inserted in the pack header when the remainder is equal to or less than 7 bytes while a padding packet is inserted at the end of the pack when the remainder exceeds 7 bytes.

Audio information in this pack format can easily be handled at the time of reproduction.

Because the top audio data in each pack is the top twin pair of samples or main samples, the reproduction process becomes easier when reproduction is executed at the proper timing. This is because the reproduction apparatus acquires data and performs data processing on a pack by pack basis. If samples of audio data are located over two packs, the two packs are acquired and audio data after integration will decoded, which complicates processing. When the top audio data in each pack is always the top twin pair of samples and audio data is grouped pack by pack as in this invention, timing information need only be taken for one pack, thus facilitating data processing. Further, the packet-by-packet data processing simplifies the authoring system (aiding system), which simplifies the software for processing data.

At the time of special reproduction or the like, video data may be subjected to thinning or interpolation. In such a case, since audio data is permitted to be handled packet by packet, it is possible to easily control the reproduction timing. Further, software for the decoders need not be complicated.

Although samples in the above-mention system are generated with each sample separated into the upper 16 bits and the lower 4 bits, data should not necessarily take such a format if linear PCM audio data is sampled.

With the data length of an extra sample being 0, for example, a train of data becomes a sequence of main samples which conforms to the general data format. In this case, no extra samples are present, so there exits no need to generate twin pairs of samples and main samples alone should be formed into packets.

FIG. 4 shows a list of linear PCM data sizes when linear PCM data are arranged in a packet in units of twin pair samples, as discussed above. The data sizes are shown as the number of maximum samples to be fitted in one pack, for the monaural (mono), stereo, and multichannel modes. Each group shows the data sizes for the respective numbers of quantization bits. Because the twin pairs of samples are taken as units, every number of samples in one packet is an even number. As the number of channels increases, the number of bytes increases accordingly, so that the number of samples in one packet decreases. When the number of quantization bits is 16 bits and the mode is the monaural mode, the number of samples in one packet is 1004, and the number of bytes is 2008 with the stuffing byte of 5 bytes, which indicates that there is no padding bytes. Note, however, that the first packet has the stuffing bytes of 2 bytes. This is because 3-byte attribute information may be affixed to the header of the first packet.

With the number of quantization bits being 24 bits and the mode being stereo, stuffing 6 bytes in the top packet and padding 9 bytes occurs subsequent packets.

Figure 5:
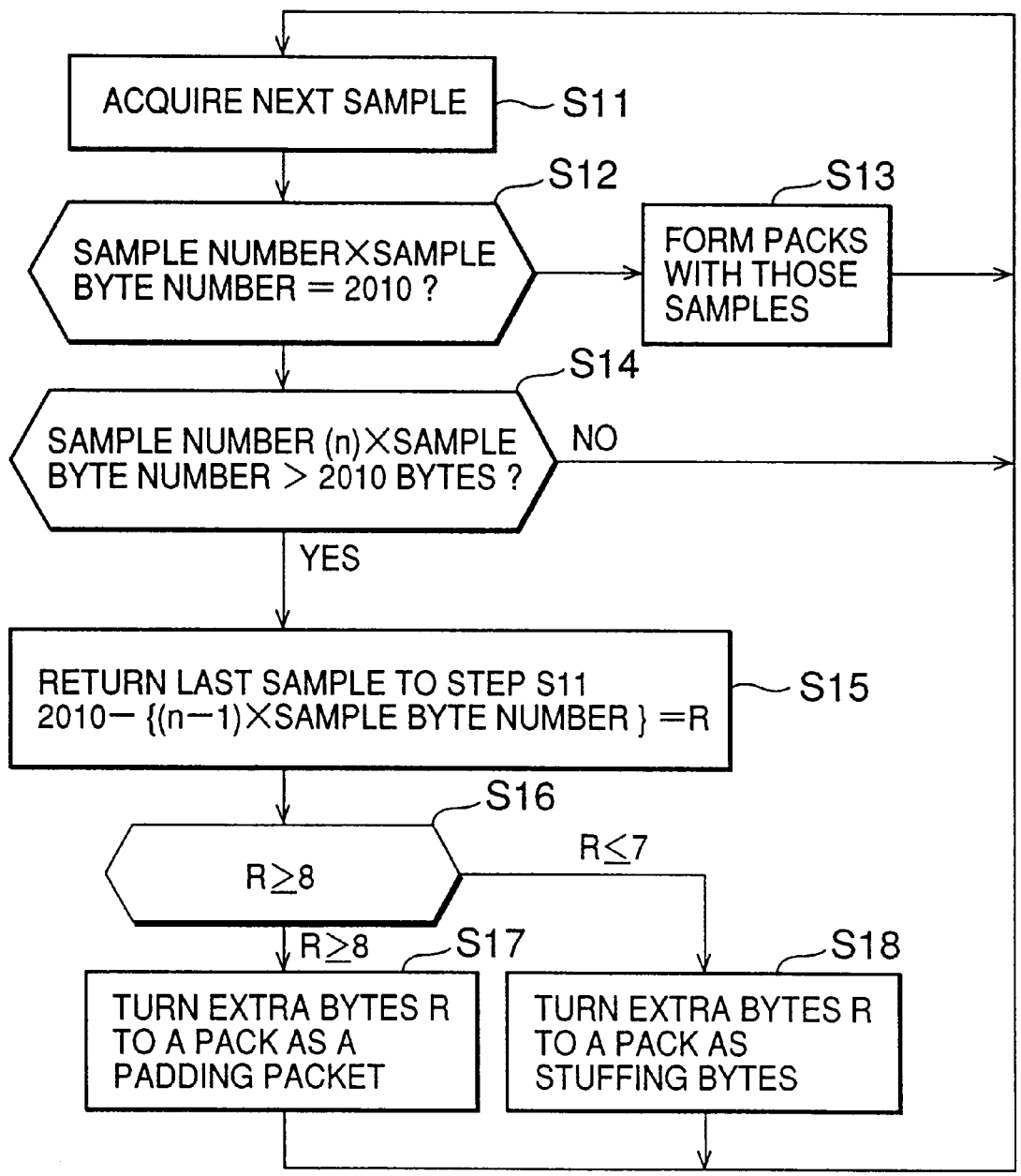
FIG. 5 is an explanatory diagram illustrating procedures of generating an audio pack.

FIG. 5 illustrates the operational procedures of the apparatus for generating packs.

Suppose that the audio signals of each channel are samples to produce the samples as shown in FIG. 1B, which are stored in the memory. In step S11, the samples are acquired one by one. In step S12, it is determined if the number of bytes has reached the capacity of a packet (2020 bytes). When it has reached 2010 bytes, those samples up to that sample are packed (step S13).

When the number of bytes has not reached the capacity of a packet (2020 bytes), the flow proceeds to step S14 where it determines if the number of bytes of the acquired samples exceeds 2010 bytes. If it does not exceed 2010 bytes, the flow returns to step S11. If it does exceed 2010 bytes the last acquired sample is returned to the position of step S11 and the difference between the number of remaining bytes and 2010 bytes is computed in step S15. Step 16 then determines if this difference R exceeds 8 bytes (step S16). If the difference R exceeds 8 bytes, padding is performed (step S17) to construct a packet, whereas if the difference R is equal to less than 7 bytes, stuffing is performed (step S18) to construct a packet.

The reproduction apparatus which reproduces the above-discussed data is briefly described below.

Figure 6:
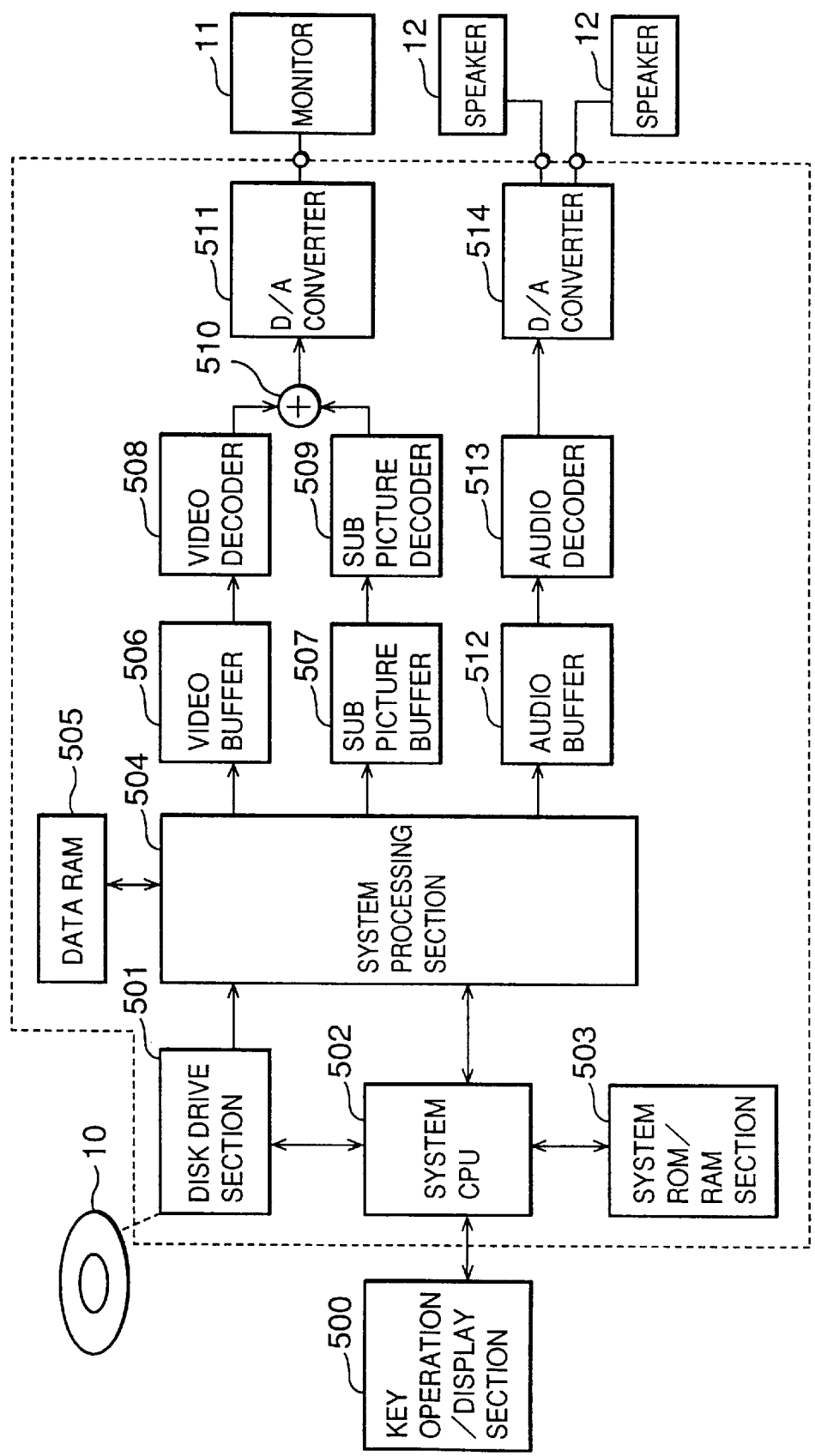
FIG. 6 is a block structural diagram of a disk playing apparatus.
Figure 7:
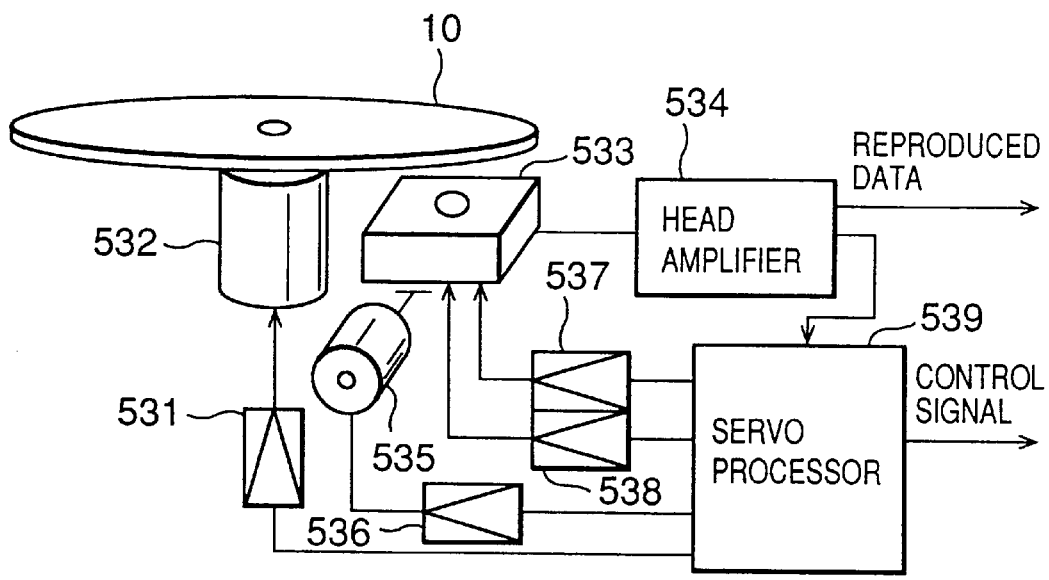
FIG. 7 is an explanatory diagram of a disk drive section.
Figure 8:
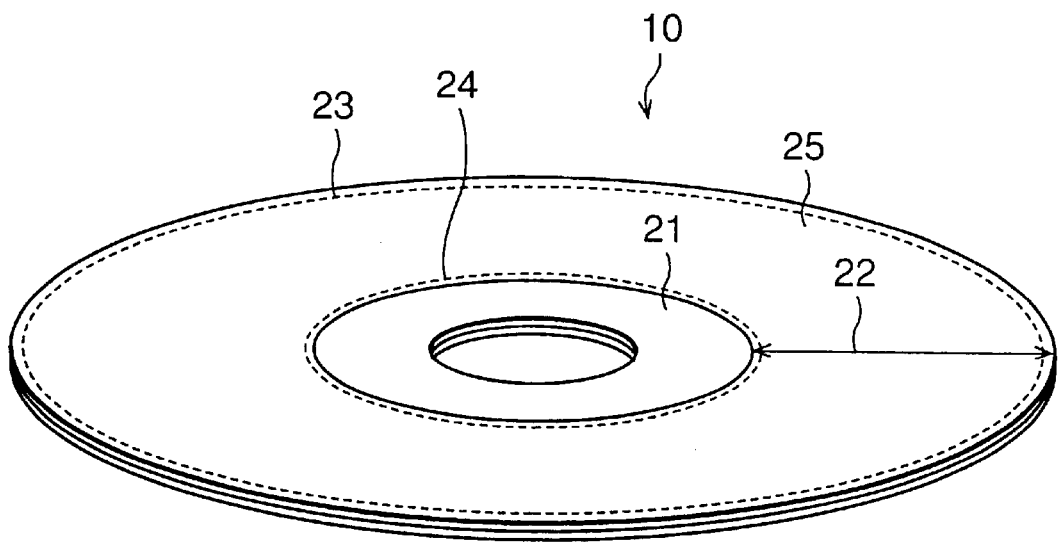
FIG. 8 is an explanatory diagram of an optical disk.

FIG. 6 shows an optical disk player, FIG. 7 shows the basic structure of a disk drive section 501 which drives an optical disk 10 on which the above-described audio stream is recorded, and FIG. 8 presents a diagram for explaining an example of the structure of the optical disk 10.

The optical disk player as depicted in FIG. 6, has a key operation/display section 500. The optical disk player is connected to a monitor 11 and speakers 12. Data picked up from the optical disk 10 is sent via the disk drive section 501 to a system processing section 504. The picked-up data from the optical disk 10 includes picture data, sub picture data and audio data, for example, which are separated in the system processing section 504. The separated picture data is supplied via a video buffer 506 to a video decoder 508, the sub picture data is supplied via a sub picture buffer 507 to a sub picture decoder 509, and the audio data is supplied via an audio buffer 507 to an audio decoder 513. The picture signal decoded by the video decoder 508 and the sub picture signal decoded by the sub picture decoder 509 are combined by a synthesizing section 510, and the resultant signal is converted to an analog picture signal by a D/A converter 511. This analog picture signal is then sent to the monitor 11. The audio signal decoded by the audio decoder 513 is converted by a D/A converter 514 to an analog audio signal which is in turn supplied to the speakers 12.

The entire player is controlled by a system CPU 502. That is, the system CPU 502 can exchange control signals, timing signals and the like with the disk drive section 501, the system processing section 504 and the key operation/display section 500. Connected to the system CPU 502 is a system ROM/RAM 503 in which fixed programs for allowing the system CPU 502 to execute data processing are stored. Management data or the like which is reproduced from the optical disk 10 can also be stored in the system ROM/RAM 503.

A data RAM 505, connected to the system processing section 504, is used as a buffer when the aforementioned data separation, error correction or the like is executed.

As illustrated in FIG. 7, the disk drive section includes a disk motor driver 531 which drives a spindle motor 532. As the spindle motor 532 rotates, the optical disk 10 turns and data recorded on the optical disk 10 can be picked up by an optical head section 533. The signal picked up by the optical head section 533 is sent to a head amplifier 534 whose output is input to the system processing section 504.

A feed motor 535 is driven by a feed motor driver 536. The feed motor 535 drives the optical head 5 section 533 in the radial direction of the optical disk 10. The optical head section 533 is provided with a focus mechanism and a tracking mechanism to which drive signals from a focus circuit 537 and a tracking circuit 538 are respectively supplied.

Control signals are input to the disk motor driver 531, the feed motor driver 536, the focus circuit 537 and the tracking circuit 538 from a servo processor 539. Accordingly, the disk motor 532 controls the rotation of the optical disk 10 in such a way that the frequency of the picked-up signal becomes a predetermined frequency, the focus circuit 537 controls the focus mechanism of the optical system in such a way that the optical beam from the optical head section 533 forms the optimal focal point on the optical disk 10, and the tracking circuit 538 controls the tracking mechanism in such a way that the optical beam hits the center of the desired recording track.

The optical disk 10 as depicticed in FIG. 8 has information recording areas 22 around clamp areas 21 on both sides. The information recording area 22 has a lead-out area 23 where no information is recorded at the outer periphery, and a lead-in area 24 where no information is recorded at the boundary with the associated clamp area 21. Between the lead-out area 23 and the lead-in area 24 lies a data recording area 25.

Tracks are continuously formed in the data recording area 25 in a spiral form. The tracks are separated into a plurality of physical sectors which are given serial numbers. Signal spots on tracks are formed as pits. For read-only optical disk, a sequence of pits is formed on a transparent substrate by a stamper, and a reflection film is formed on the pits-formed surface to form a recording layer. A double-disk type optical disk has two disks adhered together via an adhesive layer, yielding a composite disk, in such a manner that those recording layers face each other.

Figure 9:
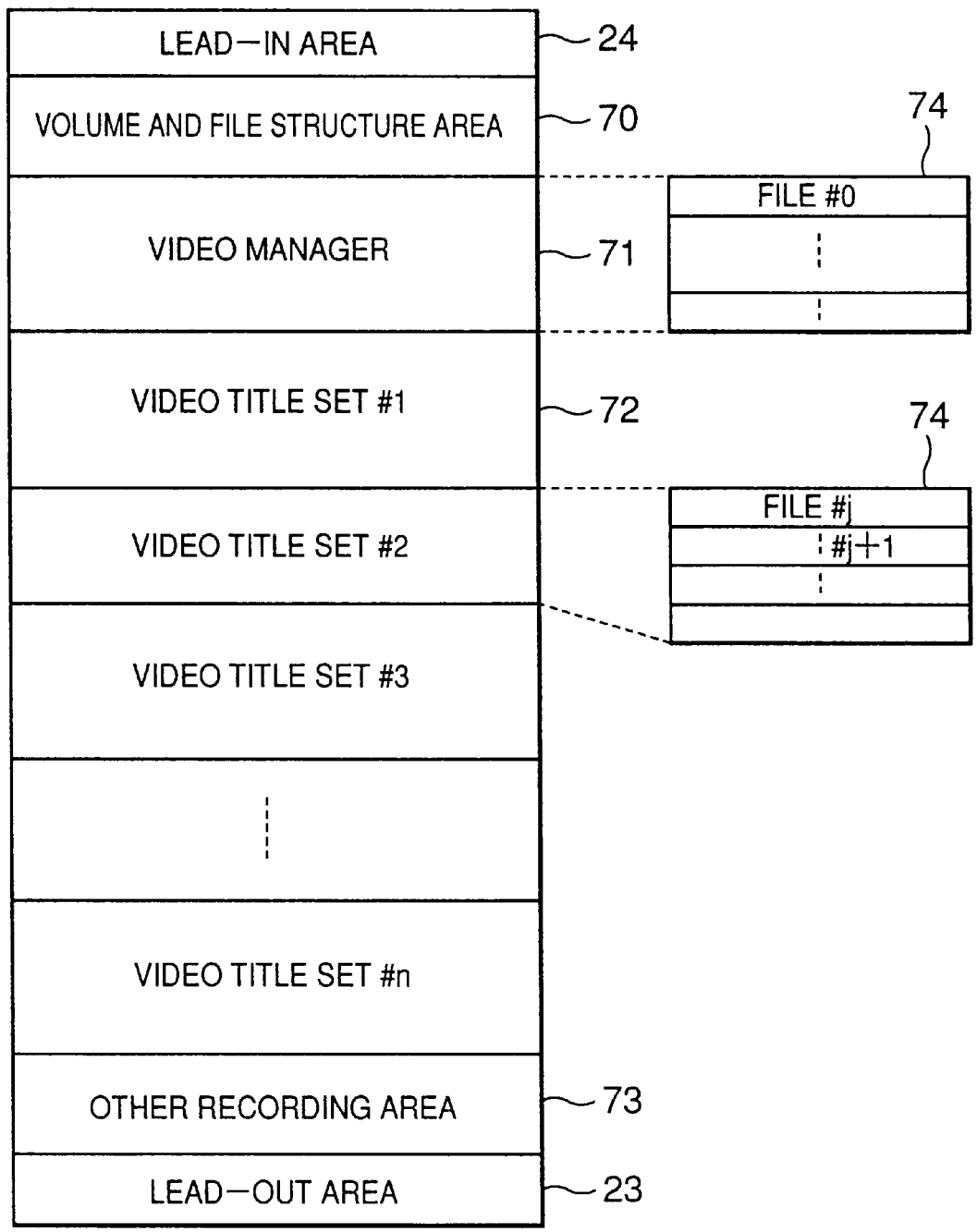
FIG. 9 is an explanatory diagram illustrating the logical format of an optical disk.

FIG. 9 shows the logical format of the information sections of the information recording area 25 of the optical disk 10. This logical format is determined in conformity to specific standards, such as micro UDF and ISO 9660. In the following description a logical address means a logical sector number (LSN) which is determined by the micro UDF and ISO 9660, and logical sectors are the same in size as the aforementioned physical sectors, each logical sector consisting of 2048 bytes. It is assumed that serial logical sector numbers (LSN) are given to the logical sectors in the ascending order of the physical sector numbers.

The logical format is a hierarchical structure and has a volume and file structure area 70, a video manager 71, at least one video title set 72 and other recording area 73. Those areas are differentiated at the boundaries of the logical sectors. As mentioned above, the size of one logical sector is 2048 bytes. The size of one logic block is also 2048 bytes, so that one logical sector is defined as one logic block.

The file structure area 70 is equivalent to a management area which is defined by the micro UDF and ISO 9660 Data in the video manager 71 is stored in the system ROM/RAM section 52 via the description in this area 70. Information for managing the video title sets is described in the video manager 71, which consists of a plurality of files 74 starting with a file #0. Recorded in each video title set 72 are compressed video data, sub picture data, audio data, and playback control information for reproducing those data. Each video title set 72 consists of a plurality of files 74, which are also differentiated at the boundaries of the logical sectors.

Recorded in the other recording area 73 is information for when the information in the video title set is used or for information which is exclusively used.

Figure 10:
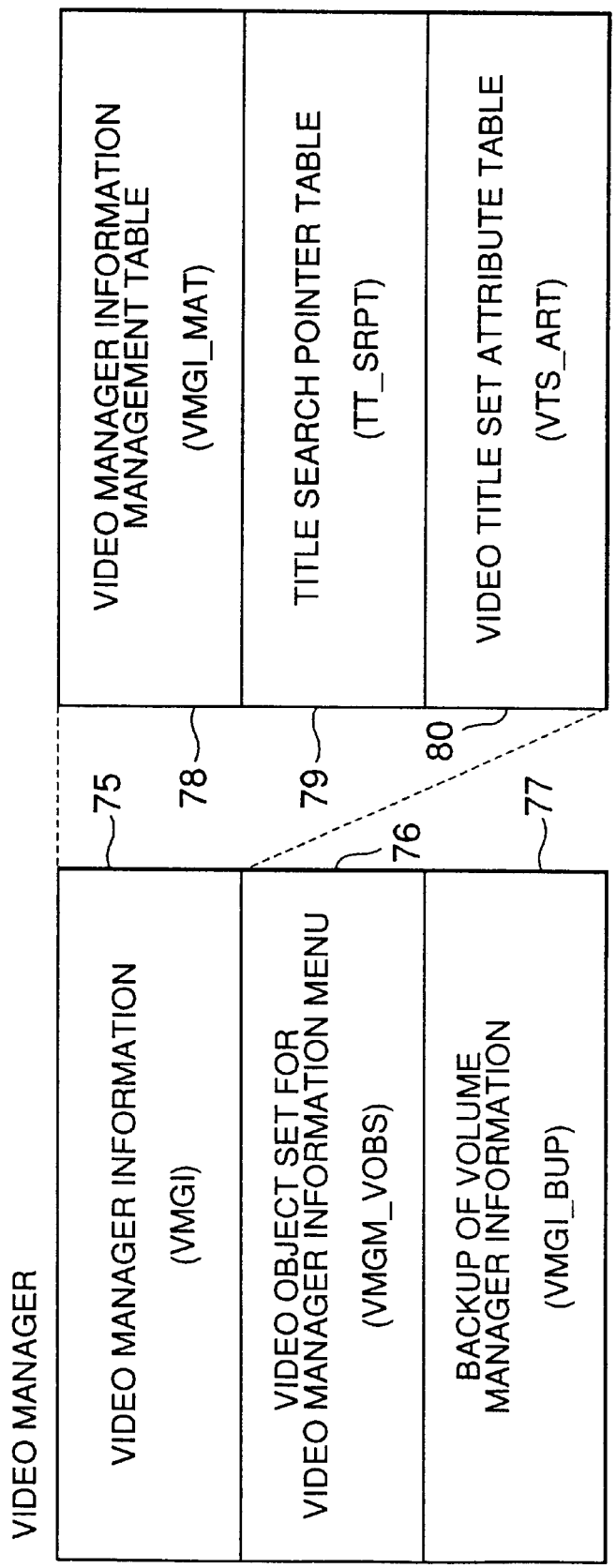
FIG. 10 is an explanatory diagram of a video manager in FIG. 9.

The video manager 71, as shown in FIG. 10, consists of video manager information (VMGI) 75, a video object set for a video manager information menu (VMGM_VOBS) 76, and a backup of video manager information (VMGI_BUP) 77.

Stored in the VMGM_VOBS 76 are video data, audio data and sub picture data for the menu which is associated with the volume of the optical disk. The VMGM_VOBS 76 can provide descriptive information, given by voices and a sub picture in association with each of titles in the volume, and the selection display for the titles. When English conversations for learning English are recorded on the optical disk, for example, the title name of each English conversation and examples of a lesson are reproduced and displayed while a theme song is acoustically reproduced, and each sub picture shows informative text corresponding to the level. The lesson numbers (levels) are displayed as selection items which are selected by a listener.

Figure 11:
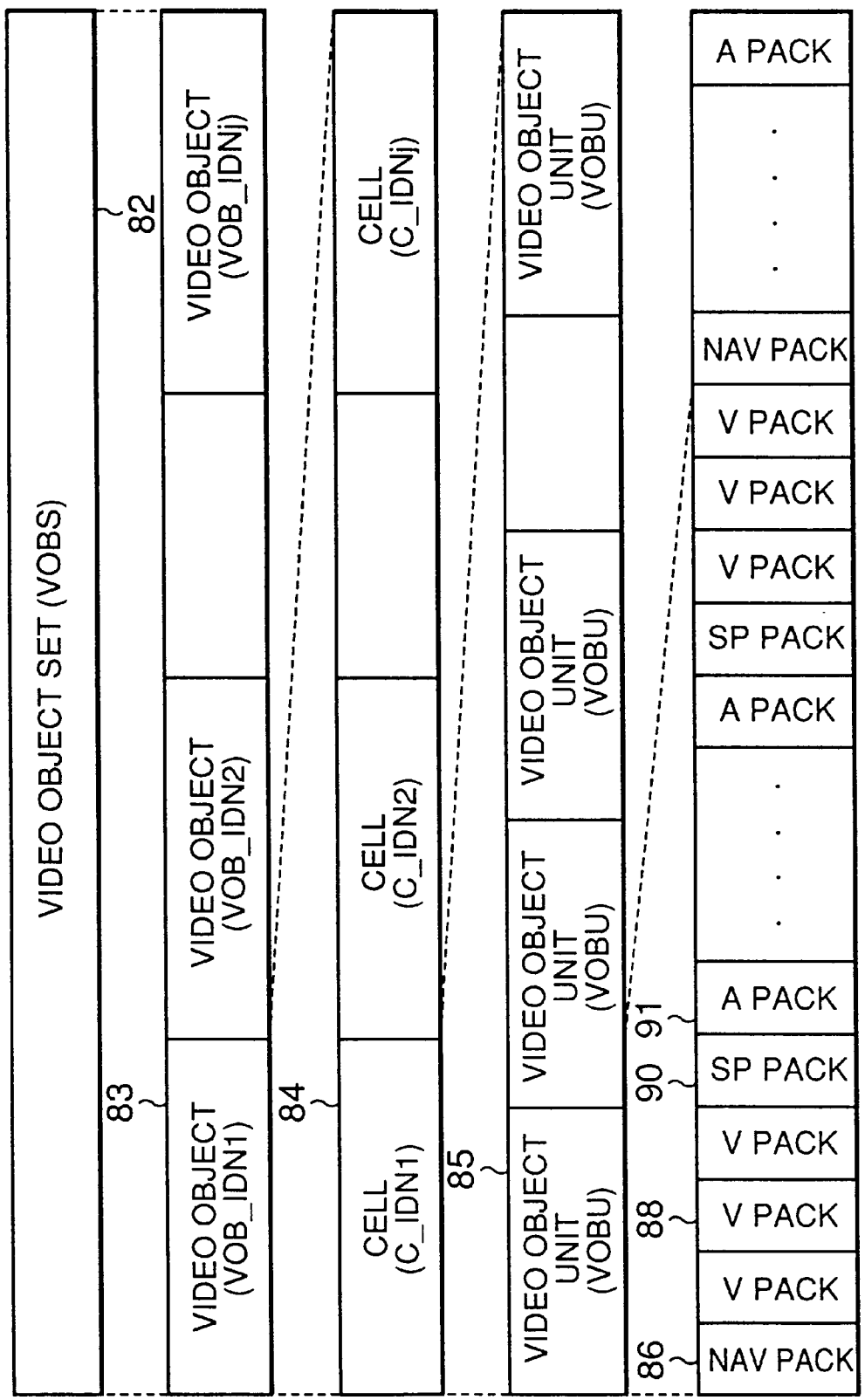
FIG. 11 is an explanatory diagram of a video object set in FIG. 8.

FIG. 11 illustrates a video object set (VOBS) 82.

There are three types of video objects sets having similar sructures, two types of video object sets for a menu and one type of video object set for video titles.

The VOBS 82 is defined as a set of one or more video objects (VOB's) 83, which are used for the same purpose. Normally, the VOBS for a menu consist of video objects (VOB's) for displaying a plurality of menu screens, while the VOBS for a video title set consists of VOB's for displaying normal moving pictures or the like.

Each VOB is given an ID number (VOB_IDN#j), to identify that VOB. One VOB consists of one cell or a plurality of cells 84. Likewise, each cell is given an ID number (C_IDN#j) to identify that cell. The video object for a menu may be comprised of a single cell.

Further, one cell consists of one or a plurality of video object units (VOBUs) 85. A single VOBU 85 is defined as a sequence of packs having a navigation pack 86 (NV pack) at the top. One VOBU 85 is defined as a set of all packs recorded between an NV pack 86 (including the aforementioned DSI) and the next NV pack 86.

The playback time for the VOBU is equivalent to the playback time for video data which consists of a single GOP (Group Of Picture) or a plurality of GOP's included in this VOBU, and is defined to be equal to or greater than approximately 0.4 sec and equal to or less than 1 sec. The MPEG standards define one GOP as compressed image data equivalent to the playback time of about 0.5 sec. According to the MPEG standards, therefore, about 0.5 sec of audio information and picture information can be arranged.

One VOBU 85 has the aforementioned NV pack 86 at the top, followed by video packs (V packs) 88, sub picture packs (SP packs) 90 and audio packs (A packs) 91 arranged in a certain order. A plurality of V packs 88 in one VOBU 85 has compressed image data whose playback time is equal to or less than 1 sec, in the form of one GOP or a plurality of GOP's. Audio signals corresponding to this playback time are compressed and arranged as A packs 91. The sub picture data used within this playback time is compressed and is arranged as SP packs 90. It is to be noted that audio signals are recorded with, for example, eight streams of data as a pack, and sub pictures are recorded with, for example, thirty two streams of data as a pack.

One stream of audio signals is data encoded by one kind of coding system, and consists of eight channels of linear PCM quantized data of 20 bits, for example.

Returning to FIG. 10, the VMGI 75 describes information for searching for a video title, and includes at least three tables 78, 79 and 80.

A video manager information management table (VMGI_MAT) 78 describes the size of the VMG 71, the start address of each information in the video manager, attribute information associated with the video object set for a video manager menu (VMGM_VOBS), and the like. title search pointer table (TT_SRPT) 79 describes entry program chains (EPGC) of the video titles included in the volume of the optical disk which are selectable in accordance with the title number input through the key operation/display section of the apparatus.

Figure 12:
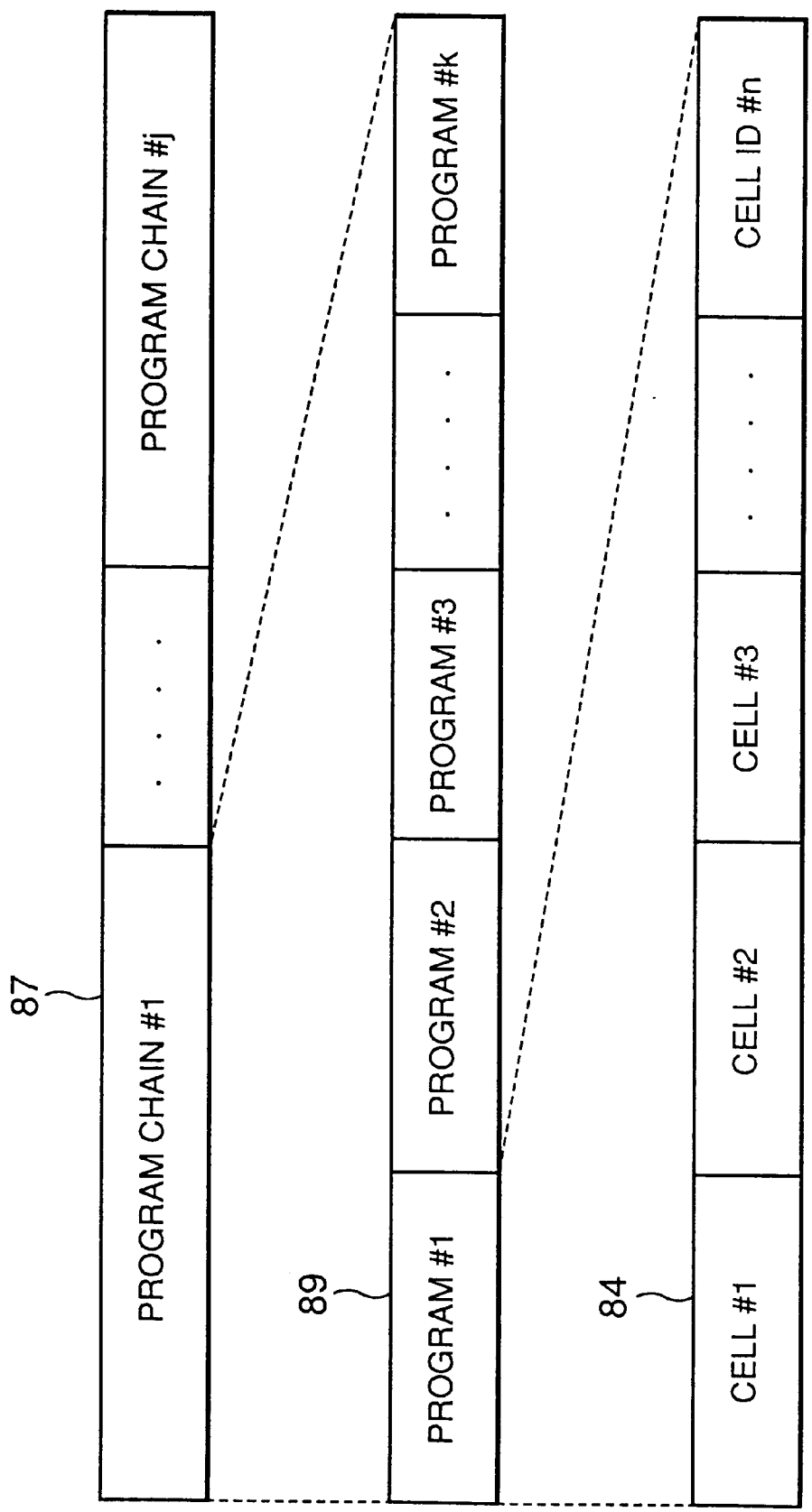
FIG. 12 is an explanatory diagram of a program chain.

The program chains will now be discussed referring to FIG. 12. Each program chain 87 is a set of program numbers for reproducing the story of a certain title, and a chapter of the story or the story itself is completed as program chains are continuously reproduced. One program number consists of a plurality of cell ID numbers each of which can specify a cell in the VOBS.

A video title set attribute table (VTS_ART) 80 describes attribute information which is determined by video title sets (VTS') in the volume of the optical disk. The attribute information includes the number of VTS', the number, the video compression system, the audio coding mode, and the display type of sub pictures.

According to the packet system according to this invention, as described above, audio data at the top of each packet is always the atop of sample data, and packets can be treated as units, so that the timing processing for processing audio data and a sequence of processes of this timing processing becomes easier.

A description will now be given of the audio decoder which reproduces data that is arranged and recorded in the above-described form.

Figure 13:
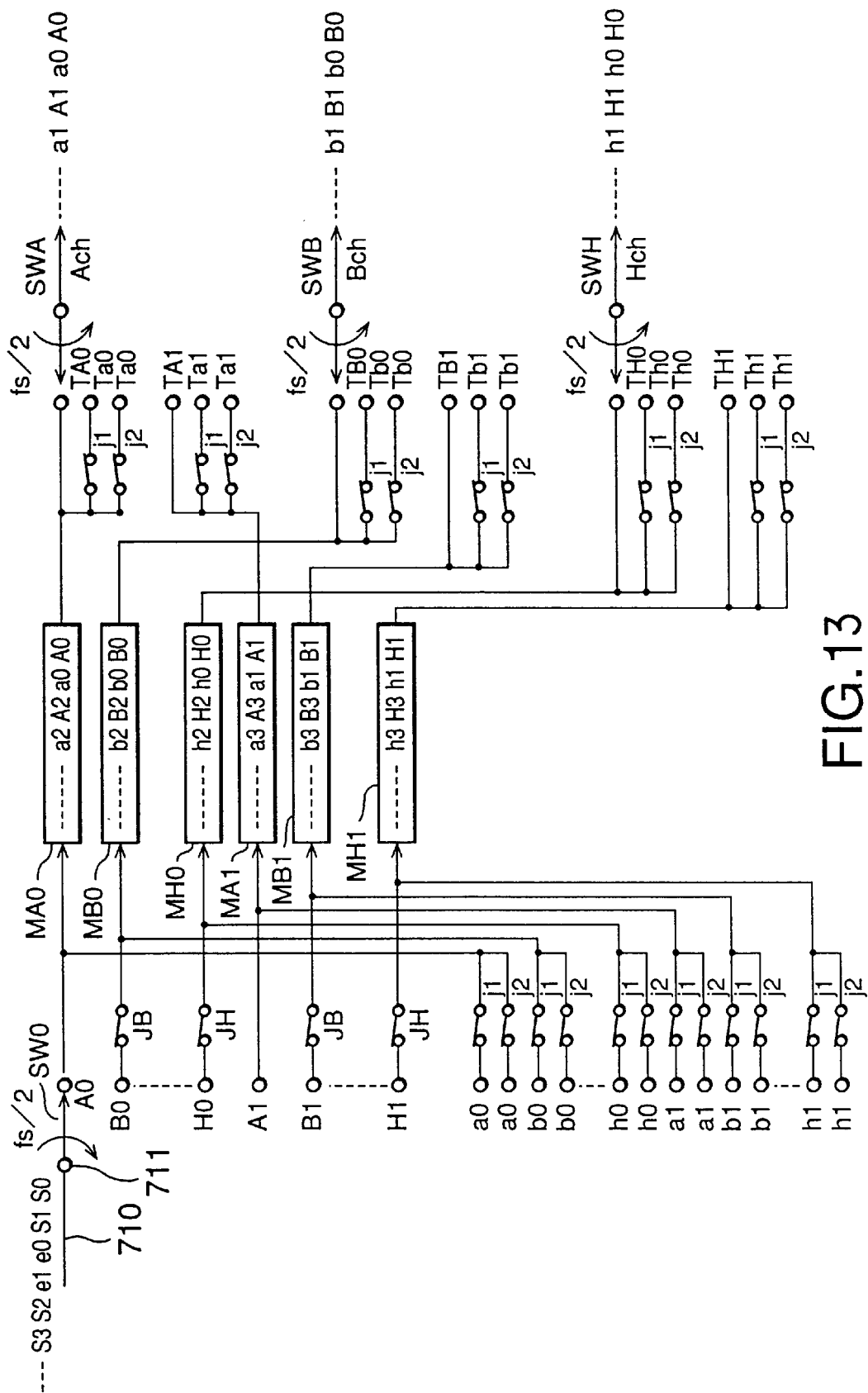
FIG. 13 is a diagram showing one example of the basic circuit structure of an audio decoder according to this invention.

FIG. 13 shows the basic structure of the audio decoder 513.

The illustrated decoder can reproduce data in all the modes for the numbers of channels and the numbers of bits of samples, as shown in FIG. 4. Input data is such that the number of quantization bits of every one of eight channels is 24 bits.

A sequence of samples as discussed with reference to FIGS. 1A–1D is continuously inputted to input terminal 710. This sequence of samples is given to the switch SW0 input terminal 711. The switch SW0 has distribution terminals for the individual samples of channels An to Hn and an to hn. The terminals associated with samples of the individual channels are given the same reference numerals as representative samples. The representative samples are samples A0 to H0, A1 to H1, a0 to h0 and a1 to h1.

It is assumed that the terminals A0 to H0 and A1 to H1 are 16-bit terminals, and the terminals a0 to h0 and a1 to h1 are 4-bit terminals. The extra sample may consist a total of eight bits, so that two sets of 4-bit terminals, a0 to h0 and a1 to h1, are prepared. The 16-bit terminal A0 is connected to the upper bits (16 bits) of a memory MA0, and the associated 4-bit terminals a0 and a0 are connected to the lower bits (8 bits) of the memory MA0 via respective switches j1 and j2.

The 16-bit terminal B0 is connected via a switch JB to the upper bits of a memory MB0, and the associated 4-bit terminals b0 and b0 are connected to the lower bits of the memory MB0 via respective switches j1 and j2. The 16-bit terminal C0 is connected via a switch JC to the upper bits of a memory MC0, and the associated 4-bit terminals c0 and c0 are connected to the lower bits of the memory MC0 via respective switches j and j2. Likewise, the other terminals D0 to H0, D1 to H1, d0 to h0 and d1 to h1 are connected to associated memories MD0 to MH1.

As a result, the individual channels are distributed to memories MA0 to MH1. The output terminals of memories MA0 and MA1 are connected to terminals TA0, Ta0, Ta0, TA1, Ta1 and Ta1 of an A channel output switch SWA. TA0 and TA1 are 16-bit terminals, and Ta0, Ta0, Ta1 and Ta1 are 4-bit terminals. Likewise, the output terminals of the memories MB0 and MB1 are connected to terminals TB0, Tb0, Tb0, TB1, Tb1 and Tb1 of a B channel output switch SWB. TB0 and TB1 are 16-bit terminals, and Tb0, Tb0, Tb1 and Tb1 are 4-bit terminals. The output terminals of the other memories are likewise connected to the associated output switches.

The operation of the audio decoder 513 will now be discussed.

Samples S0, S1, e0, e1, ..., which are arranged for the recording/transfer purpose and are to be inputed to switch SW0 can be expressed as A0, B0, ..., H0, A1, B1, ..., H1, a0, b0, ..., h0, a1, b1, ..., h0 as samples of the individual channels. Each of main words of each channel consists of 16 bits, and each extra word consists of 8 bits. Suppose that the switches of the circuit are all closed. As the rotary switch SW0 is sequentially switched from the topmost contact, associated samples are transferred to the memories MA0 to MH1. In this manner, twin pairs of samples are cyclically stored in the memories MA0 to MH1 by the action of the rotary switch SW0. Thereafter, samples of the desired channel among those samples stored in the memories MA0 to MH1 are read via the associated rotary switch. The main sample and extra sample in each read sample are decoded and then combined for the subsequent processing.

Focusing on the reading of channel A, when rotary switch SWA is at the topmost 16-bit contact position, the 16-bit sample A0 is read. Then, samples a0 having a total of 8 bits are read at two 4-bit contact positions. At the next 16-bit contact position, the 16-bit sample A1 is read. Then, samples a1 having a total of 8 bits are read at two 4-bit contact positions. As the rotary switch SWA rotates once, twin pairs of samples A0, a0 and A1, a1 of channel A are read out. In this manner, twin pairs of samples of the channel A are obtained in a time sequential form. Thereafter, with regard to the other channels B, C and so forth, samples are likewise read. Because twin pairs of samples are processed as each of the rotary switches SW0, SWA, ..., and SWH makes one turn, the rotational period should be a half of the sampling frequency (fs/2).

Figure 14:
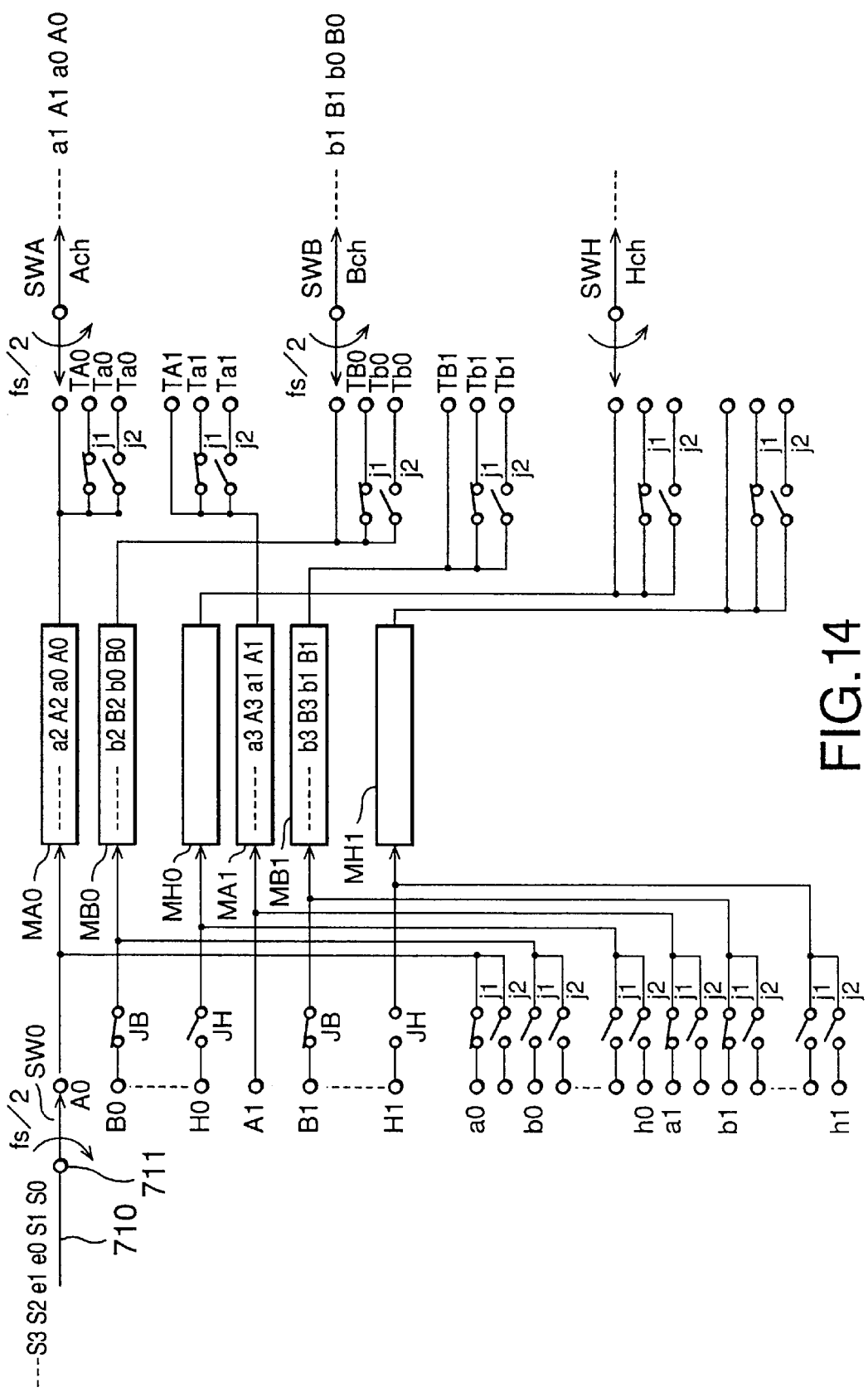
FIG. 14 is a diagram showing another example of the basic circuit structure of the audio decoder according to this invention.

FIG. 14 illustrates another embodiment of the audio decoder.

The illustrated embodiment processes data in the case where there are two channels and the number of quantization bits of each sample is 20 bits. This circuit differs from the one shown in FIG. 13 in the statuses of the switches JB-JH, j1 and j2. Therefore, same reference numerals are given to those components which are the same as the corresponding components of the circuit in FIG. 13.

Samples S0, S1, e0, e1 and so forth are expressed as A0, B0, A1, B1, a0, b0, a1, b1 and so forth as a sequence of samples of the individual channels. Each main sample of each channel consists of 16 bits, and each extra sample consists of 8 bits.

As illustrated in FIG. 14, only the switch JB is closed, and the switches JC to JH are open. With regard to switches j1 and j2, which are associated with the extra samples a0, b0, a1 and b1, as illustrated, only switches j1 are closed and the other switches are open. Also switches j1 and j2 which are associated with the other extra samples c0, . . . , h0, c1, . . . , h1 are all open.

When the rotary switch SW0 distributes input data in synchronism with the data input, the data to be transferred are A0, B0, A1, B1, a0 (4 bits), b0 (4 bits), a1 (4 bits) and b1 (4 bits). The action of the rotary switch SW0 allows the samples to be inputted to only memories MA0, MB0, MA1 and MB1 in the order as illustrated.

On the output side, outputs are obtained from those of memories MA0 to MH1 which are associated with the channels A and B. Data 0 is output from the memories associated with the other channels. Of the switches j1 and j2 on the reading side, the switches j1 are closed and the switches j2 are open. Accordingly, a 4-bit extra sample is read out following a 16-bit main sample. With regard to channel A, as switch SWA is switched, data of the channel A is sequentially outputted in the order of A0, a0 (4 bits), A1 and a1 (4 bits).

The settings of the individual switches and the switching operations in the above-described embodiment are programmably set in accordance with the number of channels of audio streams and the number of quantization bits of each sample. Such a signal processing mode is described in the video title set attribute table shown in FIG. 10 and the packet header shown in FIG. 3. In other words, audio data included in an audio packet being linear PCM data, the audio frame number, the number of quantization bits, the sampling frequency, the audio channel number, etc. are described.

The decoders illustrated in FIGS. 13 and 14 can cope with all the modes and are so-called "full decoders" in that they are adaptable in a high end machine capable of reproducing all the channels.

The concept of this invention relates to a data arranging method, a recording/reproducing method and a processing apparatus, which can cope with various kinds of modes established by multifarious combinations of the number of channels and the number of quantization bits. The data arrangement can be adapted to the aforementioned high-end machine as well as a low-end machine which meets the demand for a lower cost, e.g., the one which reproduces only 16-bit data of two channels in every mode. Such a machine advantageously has a smaller circuit scale than the high-end machine.

Although the switches used to distribute individual samples and acquire samples from the associated memories are illustrated as mechanical switches, they are all constituted of electronic circuits.

An audio decoder in a low-end player will now be described. The audio decoder processes 16- data of only channels A and B. Input samples are of eight channels and the number of quantization bits is 24 bits.

Figure 15:
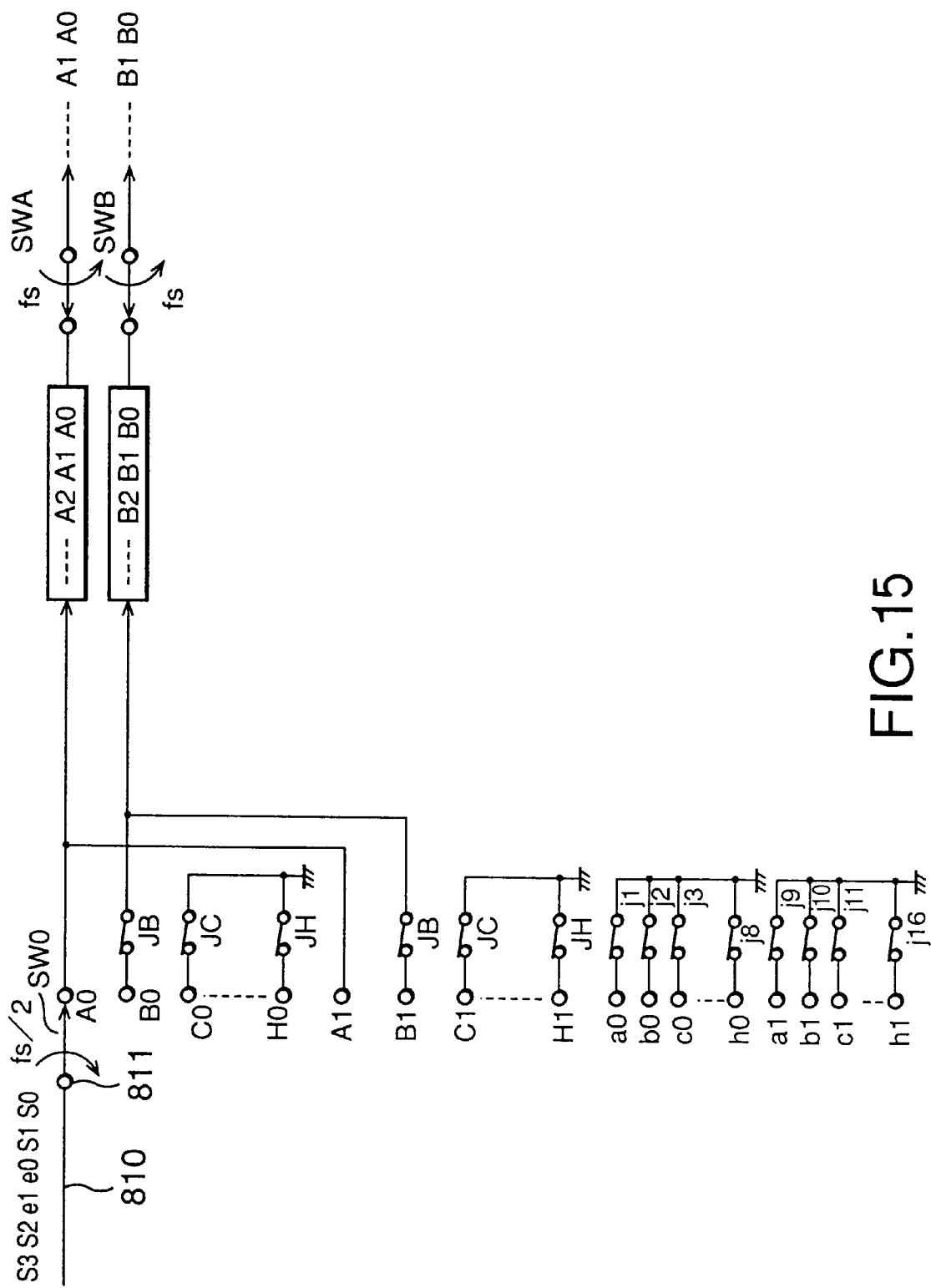
FIG. 15 is a diagram showing a further example of the basic circuit structure of the audio decoder according to this invention.

As shown in FIG. 15 a sequence of samples, as discussed with reference to FIGS. 1A to 1D, is continuously inputted to input terminal 810 in FIG. 15. This sequence of samples is applied to input terminal, 811, of a switch SW0. The switch SW0 has distribution terminals for the individual samples of channels An to Hn and an to hn. The terminals which are associated with samples of the individual channels are given the same reference numerals as representative samples, which are samples A0 to H0, A1 to H1, a0 to h0 and a1 to h1.

Terminals A0 to H0 and A1 to H1 are 16-bit terminals, and the terminals a0 to h0 and a1 to h1 are 4-bit terminals. Since the extra sample may consist a total of eight bits, two sets of 4-bit terminals, a0 to h0 and a1 to h1, are prepared.

In this low-end decoder, however, only terminals A0 and A1, and B0 and B1 are respectively connected to the memories MA and MB, with the other terminals C0-H0 and c0-h0 grounded. The switch SW0 may be designed in this manner, or may be designed to have only those systems associated with the channels A and B from the beginning.

The switches SWA and SWB facilitate reading data from the memories MA and MB in the units of 16 bits. Those switches SWA and SWB operate in such a way that output data are matched with one another.

The operation of this audio decoder will now be discussed.

Samples S0, S1 , e0, e1, . . . , arranged for the recording/transfer purpose and are inputted to switch SW0 can be expressed as A0, B0, . . . , H0, A1, B1, . . . , H1, a0, b0, . . . , h0, a1, b1, . . . , h0 as samples of the individual channels. Each main sample of each channel consists of 16 bits, and each extra word consists of 8 bits. The switches of the circuit are all closed. As the rotary switch SW0 is sequentially switched from the topmost contact, associated samples are transferred to the memories MA0 and MB1. The other samples are all discarded.

Thereafter, the samples stored in memories MA0 and MB1 are read those of the channels A and B.

Because two samples are processed as the rotary switch SW0 turns once, the rotational period should be a half of the sampling frequency fs. Because one sample is read as each of the rotary switches SWA and SWB turns once, the frequency is fs.

Another audio decoder in a low-end player processes 16-bit data of only the channels A and B. Input samples are of two channels and the number of quantization bits is 20bits.

Figure 16:
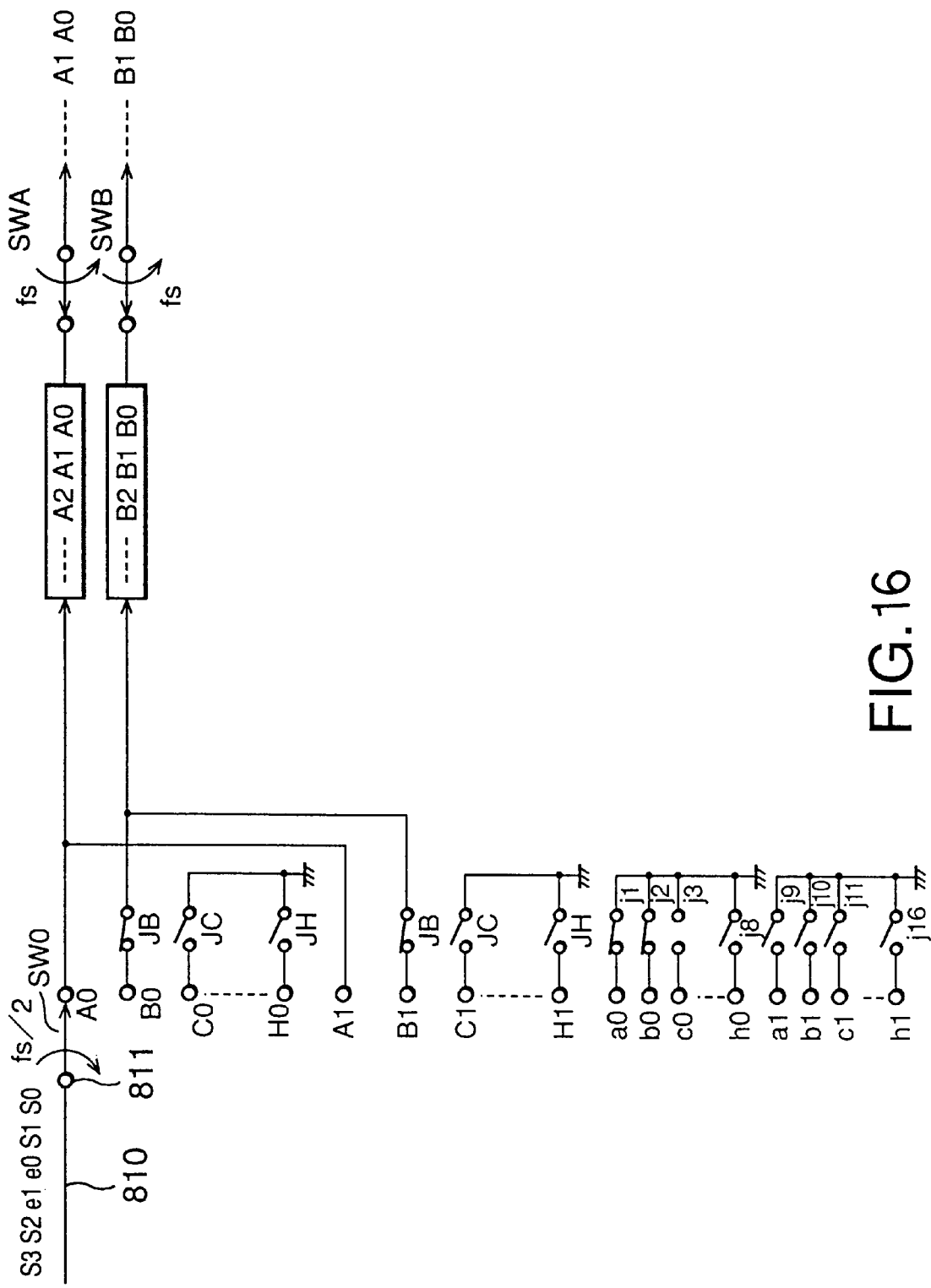
FIG. 16 is a diagram showing a still further example of the basic circuit structure of the audio decoder according to this invention.

A sequence of samples as discussed with reference to FIGS. 1A–1D are continuously inputted to the input terminal 810 in FIG. 16. This sequence of samples is given to the input terminal 811 of the switch SW0. The switch SW0 has distribution terminals for the individual samples of channels An to Hn and an to hn. The terminals which are associated with samples of the individual channels are given the same reference numerals as representative samples, which are samples A0, B0, A1, B1, a0, b0, a1 and b1.

The terminals A0, B0, A1 and B1 are 16-bit terminals, and the terminals a0, b0, a1 and b1 are 4-bit terminals. To cope with the modes for two channels and the quantization bits of 20bits, only switch JB is closed and switches JC-JH are open. Those switches j1 and j2 which are associated with the terminals a0, b0, a1 and b1 are closed and switches j3-j16 associated with the other terminals remain open.

As the rotary switch SW0 is sequentially switched in the above situation, no data transfer is performed, and only the main samples A0, B0, A1 and B1 are transferred to memories MA and MB. Regarding the extra samples a0, b0, a1 and b1, since their associated switches are grounded, those extra samples are discarded. The operation of reading samples from the memories MA and MB is carried out in the same manner as done in the previously described embodiment.

Although the foregoing description of the low-end machine has been given with reference to two modes, data of two channels can be acquired in every mode by the selective opening or closeing of the switches. The particular point that should be noted is that processing for extra samples is executed 8 bits by 8 bits. The above-described data arrangement makes the number of bits of one pair of extra samples an integer multiple of 8 bits regardless of the number of channels, even if each extra word of each channel consists of 4-bits. Even when extra samples are to be discarded in a low-end decoder, 8-bit processing is possible.

As the main words of extra samples each consist of 16 bits, they can all be processed 8 bits by 8 bits, which is very advantageous in designing a circuit.

Each audio pack has a pack header. As shown in FIG. 17, the pack header consists of a pack start code (4 bytes), a system clock reference (SCR) (6 bytes), a a program multiplexing rate (3 bytes) and a pack stuffing length (1 byte). The SCR represents the time required to fetch this audio pack. If the value of the SCR is shorter than a reference value in the disk playing apparatus, the audio pack will be stored into the audio buffer. The control circuit refers to the pack stuffing length and determines an read address on the basis of the pack stuffing length.

FIG. 18 shows the contents of the packet header of an audio packet. The packet header includes a packet_start_code prefix indicative of the start of a packet, a stream ID indicating what data the packet has, and data indicative of the length of the packet stream. Also described in the packet header are various kinds of information of a packet elementary stream (PES), such as a flag indicating the inhibition or permission of copy, a flag indicating if the information is original one or copied one and the length of the packet header. A presentation time stamp (PTS) for synchronizing the output timing of a packet with a video data or sub picture packet is further described in the packet header. Further, information, such as a flag indicating if there is any description on a buffer and the buffer size, is described in the first packet in the first field in each video object.

The packet header also contains stuffing bytes of 0 to 7 bytes. The packet header further includes a sub stream ID indicating an audio stream, linear PCM or other compressing type and the number of audio stream. Further described in the packet header are the number of frames of audio data whose first byte is located in this packet. Moreover, a pointer for a unit to be accessed first is described by the number of logic blocks from the last byte of this information. Thus, the pointer indicates the first audio frame to be recorded first at the time described by the PTS. The pointer indicates the first byte address of that audio frame. Further described in the packet header are an audio emphasis flag indicating whether or not to be emphasized high frequency band, a mute flag for providing mute when audio frame data are all 0, and a frame number indicative of the frame in an audio frame group (GOF) which should be accessed first. Control information, such as the length of a quantized word or the number of quantization bits, the sampling frequency, the number of channels and the dynamic range, is also described.

The above header information is analyzed by a decoder control section (not shown) in the audio decoder. The decoder control section switches the signal processing circuit in the decoder to the signal processing mode which is associated with currently acquired audio data. The switched modes are as discussed with reference to FIGS. 13 to 16.

Information like this header information is also described in the video manager, so that when such information is read at the initial stage of the reproducing operation, the information need not be read again thereafter for the reproduction of the same sub stream. The reason why mode information necessary to reproduce audio data is described in the header of each packet, as mentioned above, is because a receiving terminal can identify the mode of the audio data whenever reception starts in the case a sequence of packets is transferred by a communication path.

Figure 19:
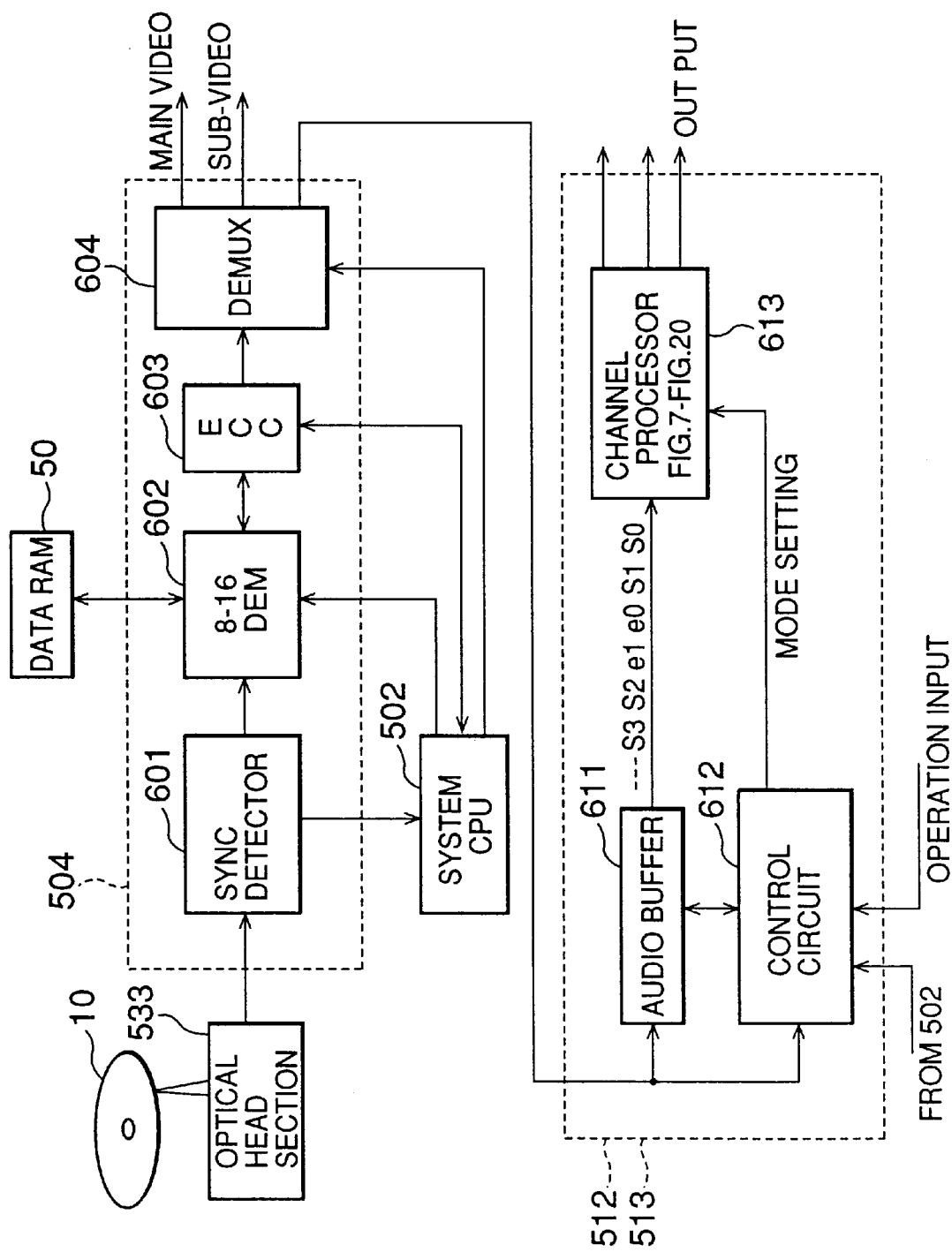
FIG. 19 is a block diagram showing mainly the audio data processing system incorporated in the disk playing apparatus.

FIG. 19 is a block diagram of the audio data processing system incorporated in the disk playing apparatus, illustrating the system processing section 504 and the audio decoder 513 in more detail than FIG. 10.

In the system processing section 504, an input high-frequency signal (read signal) is supplied to a sync detector 601. The detector 601 detects and extracts a sync signal from the read signal and generates a timing signal. The read signal now containing no sync signal, is inputted to an 8–16 demodulator 602, which demodulates the 16-bit signal into a train of 8-bit data. The 8-bit data is inputted to a error correcting circuit 603. The data output from the circuit 603, which is free of errors, is inputted to a demultiplexer 604. The demultiplexer 604 processes the data, recognizing the video pack, the sub-picture pack, and the audio pack by referring to the stream ID. These packs are supplied from the demultiplexer 604 to the video decoder 508, the sub-picture decoder 509 and the audio decoder 513.

Meanwhile, the audio pack is applied into an audio buffer 611, and the pack header and packet header of the audio pack are applied to a control circuit 612. The control circuit 612 recognizes the contents of the audio pack, i.e., the start code, stuffing length, packet start code and stream ID of the audio pack. Further, the control circuit 612 recognizes the sub-stream ID, the first access point, number of quantized audio bits, number of channels and sampling frequency. The stuffing byte length and the padding packet length are determined from these data items thus recognized, on the basis of the table shown in FIG. 4.

The control circuit 612 recognizes the packet of linear PCM based on the sub-stream ID.

As a result, the control circuit 612 can identify the extraction address of the audio data stored in the audio buffer 611. When controlled by the circuit 612, the audio buffer 611 outputs samples such as samples S0, S1, e0, e1, S2, S3 . . . . The control circuit 612 can recognize the number of stuffing bytes and/or the number of padding packets once after it has recognized at least the number of quantized bits, the sampling frequency and the number of audio channels.

The circuit 612 can extract data on the basis of these data items thus recognized.

The samples output from the audio buffer 611 are supplied to a channel processor 613. The processor 613 has a structure of the type shown in FIGS. 13 to 16.

Its operating mode is controlled by the control circuit 612.

The audio packet, the video packet, the sub-picture packet and the recording tracks of the optical disk, all described above, have a specific physical relationship, which will be explained below.

Figure 20A:
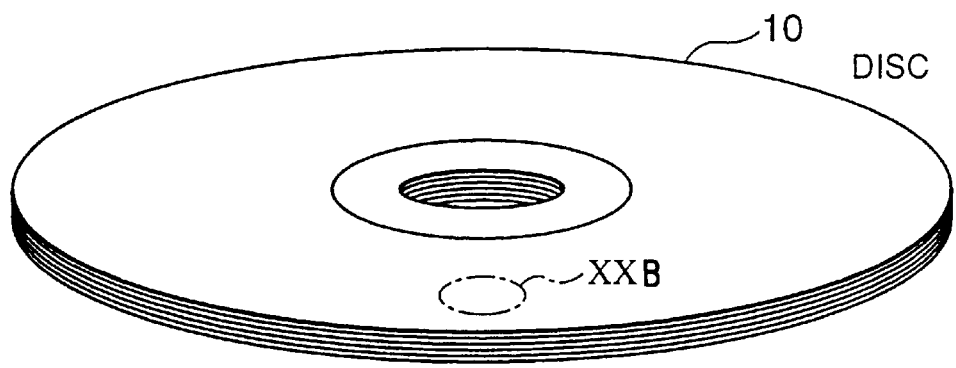
FIGS. 20A to 20D are diagrams showing a disk, a pit train, a sector train, and a physical sector, respectively.
Figure 20B:
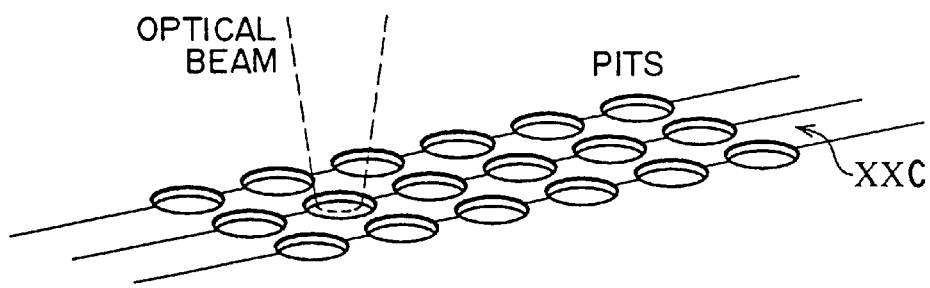
Figure 20C:
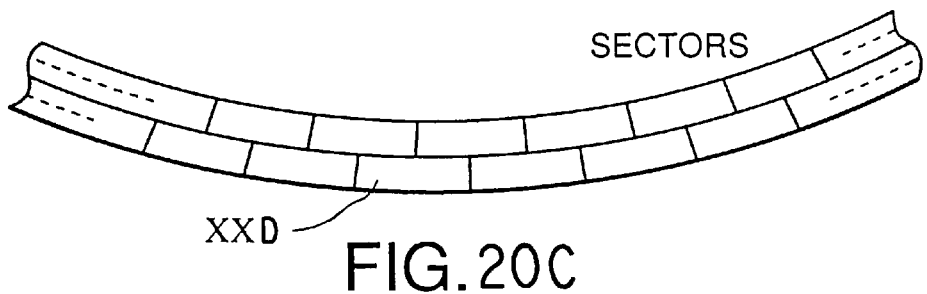
Figure 20D:
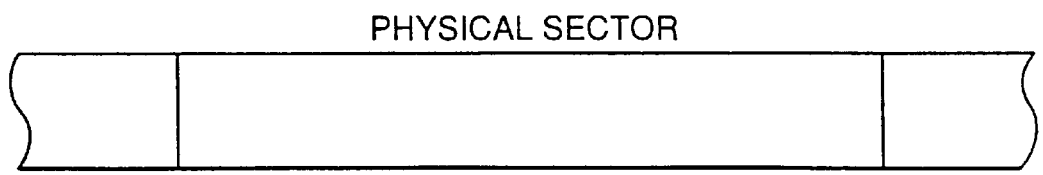

When a part of the recording surface of an optical disk 10 shown in FIG. 20A is magnified, trains of pits are seen as illustrated in FIG. 20B. A set of pit trains constitute a sector as seen from FIGS. 20C and 20D which are two other magnified views of the optical disk 10. The sectors are sequential read by the optical head. Then the audio packets are reproduced in Real time.

Figure 21A:
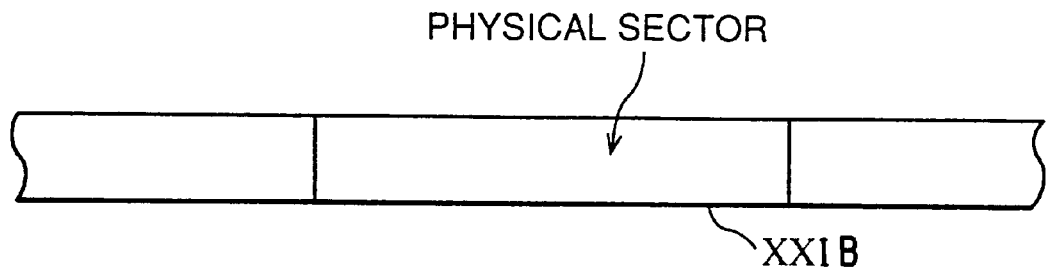
FIGS. 21A and 21B are respectively a diagram showing a physical sector and a table representing the contents of the physical sector.
Figure 21B:
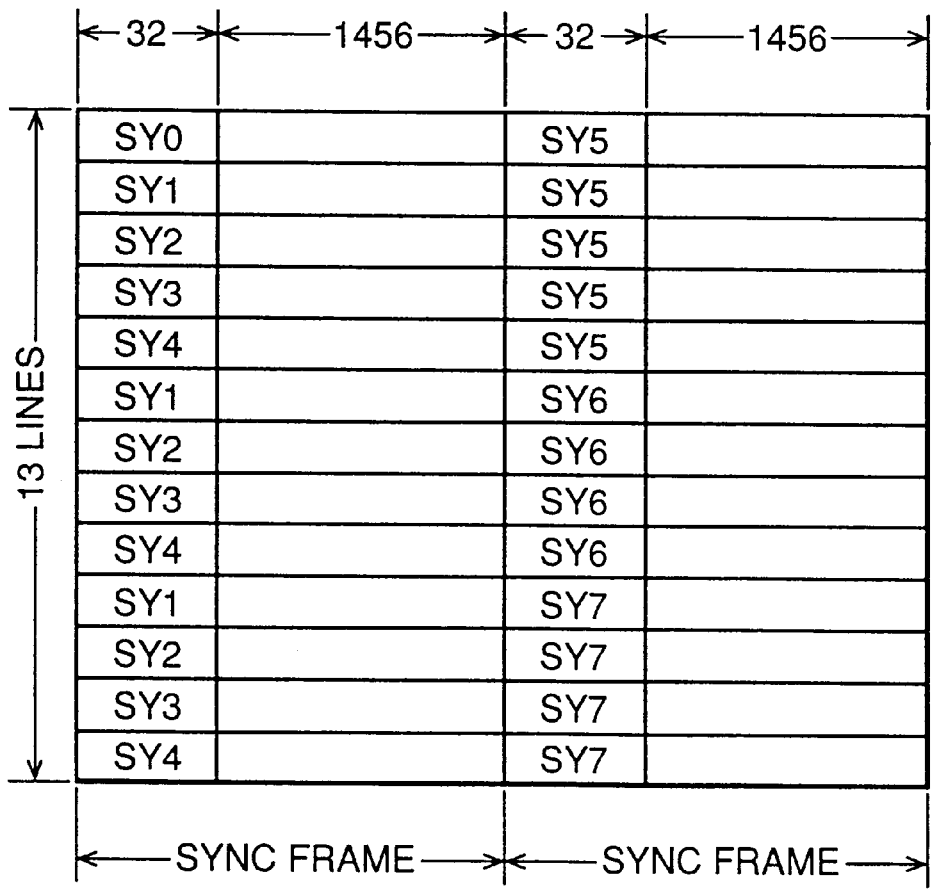

The sectors will be described with reference to FIGS. 21A and 21B. As shown in FIG. 21B, a sector in which audio data is recorded, consists of 13×2 frames. One sync code is assigned to each sector. Although the frames are shown in FIG. 21B as if sequentially arranged in rows and columns, they are sequentially arranged in a single row on one track. More specifically, the frames having sync codes SY0, SY5, SY1, SY5, SY2, SY5, . . . are arranged in the order they are mentioned.

The sync code assigned to one frame consists of 32 bits (16 bits×2), and the data recorded in one frame consists of 1456 bits (16 bits×91). This means that the sector is expressed by 16-bit modulated code, since 16-bit data items obtained by modulating 8-bit data items are recorded on the optical disk. Also recorded each sector includes a modulated error-correction code.

Figure 22A:
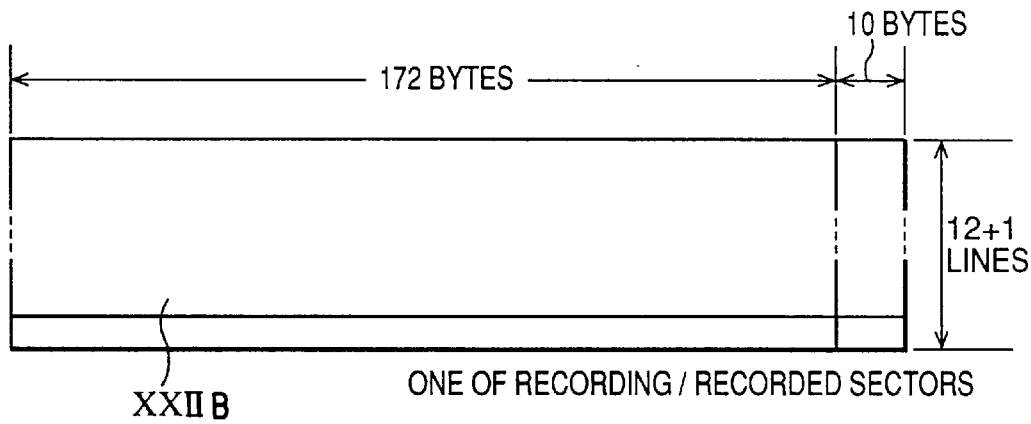
FIGS. 22A and 22B are diagrams showing the structure of a recording/recorded sector.

FIG. 22A shows a sector in which there are 8-bit data items obtained by demodulating the 16-bit data items recorded in the physical sector described above. The amount of data in this sector is: (172+19) bytes×(12+1) lines. Each line contains a 10-byte error-correction code. One correction code is provided for each line. When twelve correction codes for twelve lines, respectively, are collected, they functions an error-correction code for twelve columns.

Figure 22B:
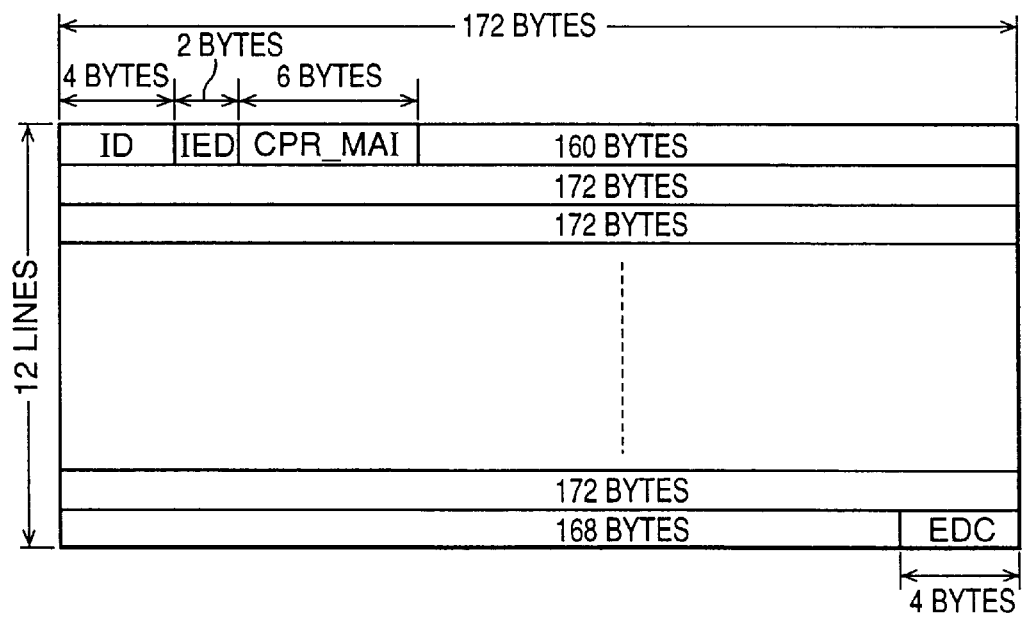

The data recorded in one recording/recorded sector becomes a data block of the type shown in FIG. 22B when the error-correction signal is removed from it. The data block consists of 2048-byte main data, 6-byte sector ID, a 2-byte ID error-detection code, 6-byte copyright management data, and a 4-byte error-detection code. As FIG. 22B shows, the sector ID, ID error-detection code and the copyright management data are added to the head of the main data, whereas the error-detection code is added to the end of the main data. The 2048-byte main data is one pack defined above. A pack header, packet header and audio data are described in the pack, in the order mentioned from the head of the pack. In the pack header and the packet header there are described various items of guide information which will be used to process the audio data.

As indicated above, one packet which consists of audio samples arranged in a specific way is recorded in each recording/recorded sector on the disk. The audio decoder can reproduce linear PCM data in a desired manner despite that the PCM data is recorded in one recording/recorded sector. This is because the start part of the audio data contained in any pack is the start part of the main sample, and also because the pack header and the packet header contain control data sufficient for the audio decoder to process audio data.

An error-correction code (ECC) block will be described, with reference to FIGS. 23A and 23B.

Figure 23A:
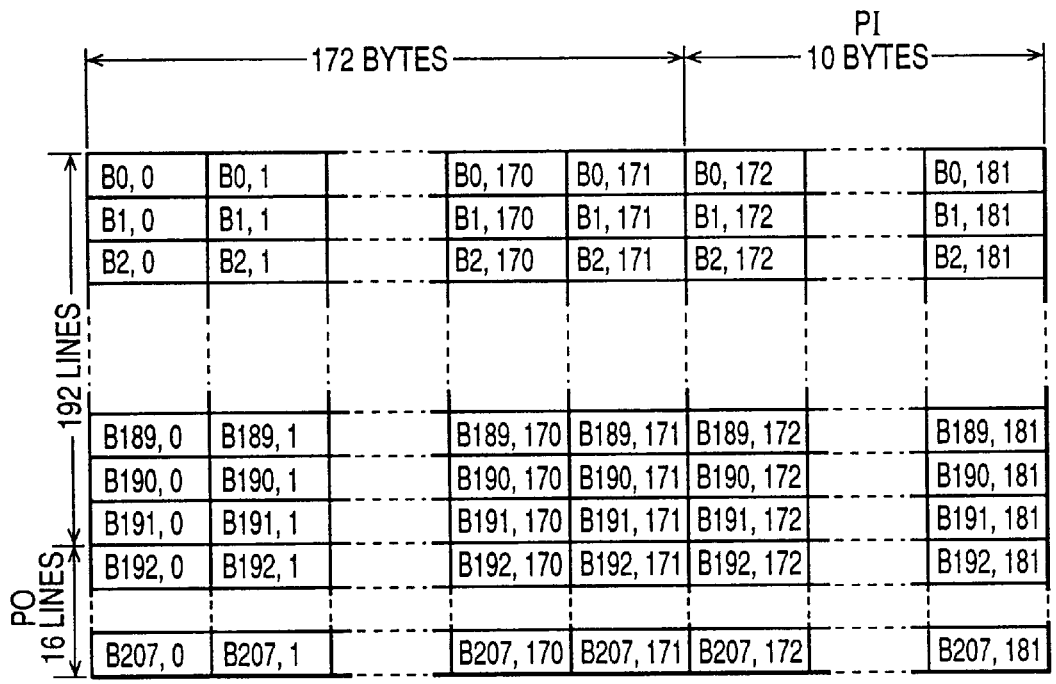
FIGS. 23A and 23B are diagrams illustrating an error-correction code block.
Figure 23B:
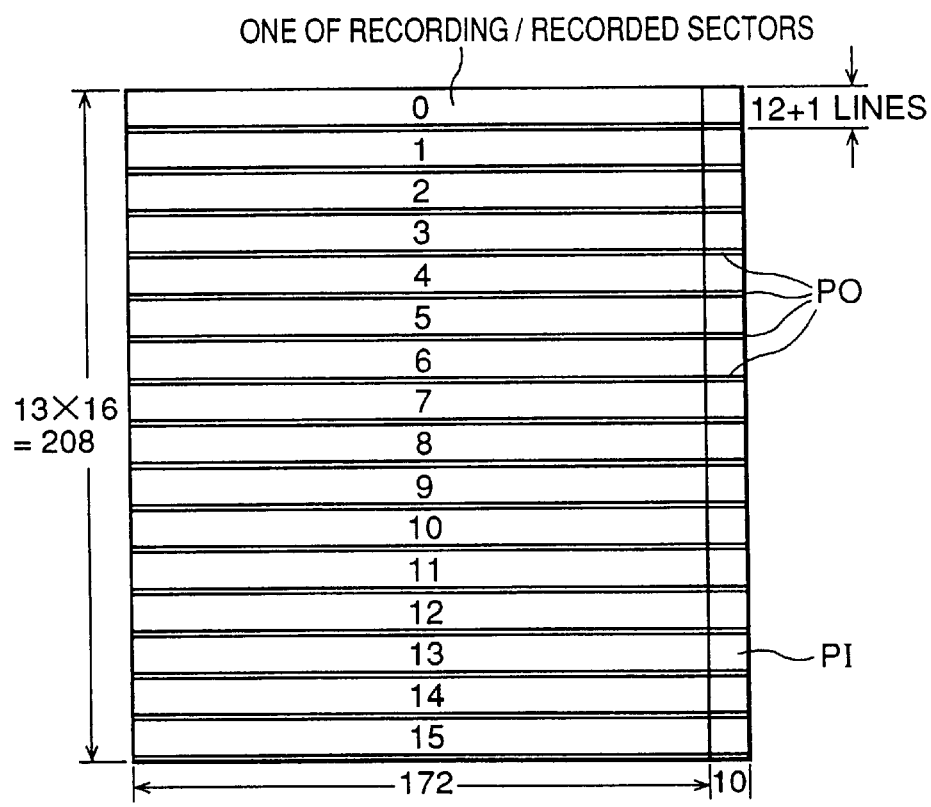

As shown in FIG. 23A, the ECC block consists of 16 recording/recorded sectors. As shown in FIG. 22A, each sector can record 12 lines of data, each line being a 127-byte data item. A 16-byte outer parity (PO) is added to each column, and a 10-byte inner parity (PI) is added to each line. As shown in FIG. 23B, the 16-byte outer parity (PO) is distributed, one bit to each line. As a result, one recording/recorded sector holds 13 lines (12+1) of data. In FIG. 27A, "B0, 0, B0, 1, 2, . . . " indicate addresses of bytes. In FIG. 27B, "0, 1, 2, . . . 15" designate the 16 recording/recorded sectors, respectively.

The video packs, sub picture packs and audio packs are interlaced on the track of the disk. However, this invention is not limited to this arrangement of the packs. This invention can be applied to the disk which only the audio packs are arranged, or the disk which the audio packs and sub packs are arranged, or the disk which the audio packs, sub packs and NV packs are arranged. It is free to combine the packs each other.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A packet processing apparatus comprising:

an input terminal for receiving a sequence of packets through channels, each of said packets being of a predetermined data byte length in accordance with a number of said channels and including a plurality of sample data portions having different data byte lengths, said sample data portions, other than a first sample data portion in each of said packets, are sequentially arranged in each of said packets so that a top of said first sample data portion is disposed at a predetermined position within said packets and a total data byte length of said sample data portions in each of said packets is less than or equal to said predetermined data byte length, wherein stuffing byte data or padding byte data is inserted to fill in a remaining portion of each said packets if the byte length of each of said packets is less than said predetermined data byte length;

an input switch for separating, channel by channel, said sample data portions from said input terminal and outputting sample words of each channel;

a plurality of memory units for storing said sample words; and a plurality of output switches for reading said sample words from said memory units.

2. The packet processing apparatus according to claim 1, wherein said input switch contains distribution terminals associated with all channels included in said sample data portions in each of said packets.

3. The packet processing apparatus according to claim 1, wherein said input switch contains distribution terminals associated with all channels included in said sample data portions in each of said packets, wherein some groups of said distribution terminals are connected to said memory units while other groups of said distribution terminals are grounded or open.

* * * * *